US007839516B2

United States Patent
Tomita et al.

(10) Patent No.: US 7,839,516 B2
(45) Date of Patent: Nov. 23, 2010

(54) PRINTING CONTROL METHOD AND APPARATUS

(75) Inventors: Makoto Tomita, Kanagawa (JP);
Shigeki Kuroda, Kanagawa (JP);
Hidekazu Morooka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1560 days.

(21) Appl. No.: 10/238,783

(22) Filed: Sep. 11, 2002

(65) Prior Publication Data

US 2003/0112456 A1 Jun. 19, 2003

(30) Foreign Application Priority Data

Sep. 14, 2001 (JP) .............................. 2001-280760

(51) Int. Cl.
*B41B 1/00* (2006.01)
(52) U.S. Cl. ..................... 358/1.15; 358/1.13; 358/1.1; 700/3; 700/9; 700/19; 700/20; 709/201; 709/208; 709/220; 709/248
(58) Field of Classification Search ................ 358/1.15, 358/1.16, 1.13, 1.1, 1.12, 1.18; 707/102; 700/19, 3, 9, 20; 717/168; 709/247, 201, 709/208, 220, 248
See application file for complete search history.

(56) References Cited

U.S. PATENT DOCUMENTS

| | | | | |
|---|---|---|---|---|
| 5,699,495 A * | 12/1997 | Snipp | ......................... | 358/1.15 |
| 6,088,120 A * | 7/2000 | Shibusawa et al. | ......... | 358/1.15 |
| 6,149,323 A * | 11/2000 | Shima | ......................... | 400/76 |
| 6,349,304 B1 * | 2/2002 | Boldt et al. | ................. | 707/102 |
| 6,490,052 B1 * | 12/2002 | Yanagidaira | ................ | 358/1.15 |
| 6,552,813 B2 * | 4/2003 | Yacoub | ....................... | 358/1.1 |
| 6,757,070 B1 * | 6/2004 | Lin et al. | ...................... | 358/1.1 |
| 6,825,941 B1 * | 11/2004 | Nguyen et al. | ............. | 358/1.15 |
| 6,831,752 B1 * | 12/2004 | Matsuo | ....................... | 358/1.13 |
| 6,847,466 B1 * | 1/2005 | Gazdik et al. | .............. | 358/1.15 |
| 6,967,728 B1 * | 11/2005 | Vidyanand | .................. | 358/1.12 |
| 7,016,066 B2 * | 3/2006 | Otake | .......................... | 358/1.15 |
| 7,047,088 B2 * | 5/2006 | Nakamura et al. | ............ | 700/19 |
| 2002/0030852 A1 * | 3/2002 | Matsuo | ....................... | 358/1.15 |
| 2002/0051204 A1 * | 5/2002 | Ohara | ......................... | 358/1.16 |
| 2002/0054348 A1 * | 5/2002 | Ishioroshi et al. | .......... | 358/1.15 |
| 2002/0063305 A1 * | 5/2002 | Koike | .......................... | 257/529 |
| 2002/0163666 A1 * | 11/2002 | Iwata et al. | ................. | 358/1.15 |
| 2002/0171868 A1 * | 11/2002 | Yoshimura et al. | ......... | 358/1.15 |

(Continued)

FOREIGN PATENT DOCUMENTS

EP    0 974 890    1/2000

(Continued)

*Primary Examiner*—Edward L Coles
*Assistant Examiner*—Ashish K Thomas
(74) *Attorney, Agent, or Firm*—Fitzpatrick, Cella, Harper & Scinto

(57) ABSTRACT

When registration of favorite is designated in a group printer driver capable of comprehensively controlling a plurality of member printer drivers, a name input window is presented. When the name of the favorite is input, DEVMODE information is acquired from each member printer driver in the present member printer configuration (e.g., printers A, B, and C). These pieces of DEVMODE information are registered in one-to-one correspondence with printer IDs. If the registered favorite is designated, the registered DEVMODE information is transferred to each registered member printer driver to restore the set state. This provides a mechanism capable of efficient printing setting for a plurality of printer drivers.

27 Claims, 21 Drawing Sheets

U.S. PATENT DOCUMENTS

| | | | |
|---|---|---|---|
| 2002/0181013 A1* | 12/2002 | Dunlap | 358/1.15 |
| 2002/0181022 A1* | 12/2002 | Tokashiki | 358/1.18 |
| 2003/0002077 A1* | 1/2003 | Shima | 358/1.15 |
| 2003/0011802 A1* | 1/2003 | Nakagiri et al. | 358/1.13 |
| 2003/0053105 A1* | 3/2003 | Morooka et al. | 358/1.13 |
| 2003/0053129 A1* | 3/2003 | Morooka et al. | 358/1.15 |
| 2003/0063305 A1* | 4/2003 | McIntyre | 358/1.13 |
| 2003/0231328 A1* | 12/2003 | Chapin et al. | 358/1.13 |
| 2004/0061894 A1* | 4/2004 | Yoshida et al. | 358/1.15 |
| 2004/0205743 A1* | 10/2004 | Sugahara | 717/168 |

FOREIGN PATENT DOCUMENTS

| | | |
|---|---|---|
| EP | 1 122 634 | 8/2001 |
| JP | 08-286854 | 11/1996 |
| JP | 09-006557 | 1/1997 |
| JP | 09-146731 | 6/1997 |
| JP | 09-188007 | 7/1997 |
| JP | 9-319533 A | 12/1997 |
| JP | 10-105349 | 4/1998 |
| JP | 11-232054 A | 8/1999 |
| JP | 11-232059 | 8/1999 |
| JP | 2000-222159 | 8/2000 |
| JP | 2000-259375 | 9/2000 |

\* cited by examiner

FIG. 15

| | SETTING ITEMS | MEMBER PRINTER DRIVER A | MEMBER PRINTER DRIVER B | MEMBER PRINTER DRIVER C |
|---|---|---|---|---|
| COMMON SETTING ITEMS | LOGICAL SHEET SIZE | A4 | A4 | A4 |
| | OUTPUT SHEET SIZE | A4 | A4 | A4 |
| | USER DEFINED SHEET | A4 | A4 | A4 |
| | PRINTING ORIENTATION | Portrait | Portrait | Portrait |
| | MARGIN | 5mm | 5mm | 5mm |
| | MAGNIFICATION | 1 | 1 | 1 |
| | NUMBER OF COPIES | 1 | 1 | 1 |
| | COPY UNIT(GROUP, COLLATE) | ※ | ※ | ※ |
| | SORT(NON-COLLATE) | ※ | ※ | ※ |
| | PAGE LAYOUT | 1 Page/Sheet | 1 Page/Sheet | 1 Page/Sheet |
| | ARRANGEMENT | ※ | ※ | ※ |
| | DOUBLE-SIDED/SINGLE-SIDED | Single-Sided | Single-Sided | Single-Sided |
| | RESOLUTION | 600dpi | 600dpi | 600dpi |
| | GRAY SCALE | NO | NO | NO |
| EXTENDED SETTING ITEMS | ROTATION | ※ | ※ | ※ |
| | WATERMARK | ※ | ※ | YES |
| | PAGE OPTION | ※ | ※ | ※ |
| | BINDING DIRECTION | ※ | ※ | ※ |
| | BINDING MARGIN | ※ | ※ | ※ |
| | STAPLE | ※ | ※ | ※ |
| | STAPLE① | ※ | ※ | ※ |
| | SADDLE (BOOKBINDING PRINTING) | ※ | ※ | ※ |
| | SADDLE UPPER-LIMIT NUMBER OF COPIES | ※ | ※ | ※ |
| | METHOD OF BOOKBINDING PRINTING | ※ | ※ | ※ |
| | OPENING DIRECTION | ※ | ※ | ※ |
| | BOOKBINDING MARGIN | ※ | ※ | ※ |
| | LOWER-LIMIT VALUE OF BOOKBINDING MARGIN | ※ | ※ | ※ |
| | PUNCH | ※ | ※ | ※ |
| | Z-FOLD | ※ | ※ | ※ |
| | 4-SIDED POSTCARD | ※ | ※ | ※ |
| | SHEET MIXING | ※ | ※ | ※ |
| | INSERTER | ※ | ※ | ※ |
| | PAPER FEED METHOD | ※ | ※ | ※ |
| | PAPER FEED UNIT | ※ | ※ | ※ |

FIG. 21

| NAME OF FAVORITE |
|---|
| GROUP PRINTER DEVMODE INFORMATION |
| PRINTER ID (PRINTER A) |
| DEVMODE INFORMATION |
| PRINTER ID (PRINTER B) |
| DEVMODE INFORMATION |
| PRINTER ID (PRINTER C) |
| DEVMODE INFORMATION |

PRINTING CONTROL METHOD AND APPARATUS

FIELD OF THE INVENTION

The present invention relates to a printing control apparatus and method of performing printing control for a document to be printed, a program for performing computer-executable printing data processing, and a storage medium storing a computer-readable program.

BACKGROUND OF THE INVENTION

Recently, network apparatuses are generally used, and many personal computers (PCs) and printers are connected to networks. In this network environment, a print job control system which processes one print job by using a plurality of printers can be constructed. As this print job control system, a distributed printing system, color-monochrome distributed printing system, broadcast printing system, error-based print job redirecting printing system, and the like are known.

The distributed printing system is a print job control system in which, to shorten the printing time of a document having a large number of pages or a document from which a large number of copies are to be made, a print job of the document is once spooled and distributed page by page or copy by copy to a plurality of printers and output by these printers.

The color-monochrome distributed printing system is a print job control system in which, to reduce the printing cost and shorten the printing time of a document having both color pages and monochrome pages in the network environment as described above, the color pages are distributed to and output by color printers, and the monochrome pages are distributed to and output by monochrome printers.

The broadcast printing system is a print job control system in which, in the network environment as described above, one document is transmitted to and printed by a plurality of printers at the same time by one printing instruction.

The error-based print job redirecting printing system is a print job control system in which, if an error occurs in a printer to which a document is transmitted in the network environment as described above, the print job is automatically switched to another printer and printed.

To facilitate setting of individual printers in any of the print job control systems as described above, a method has been proposed by which the print job control system itself is set by transmitting a printing instruction not to a plurality of printers connected to the system but to one virtual printer driver (group printer driver) as a group of these printers.

On the other hand, Japanese Patent Laid-Open No. 2000-222159 has proposed a function by which, in the user interface of a general printer driver for a single printer, different setting items are collectively registered, and an operator selects this registered setting to set a plurality of setting items at once.

Unfortunately, when printing such as distributed printing, broadcast printing, or print job redirecting printing is performed by using a plurality of printers in the print job control system, the details of each printer driver for actually outputting data cannot be set by the group printer driver in some cases. In cases like this, individual printer drivers (member printer drivers) must be separately set. This requires a cumbersome operation of individually setting these member printer drivers whenever a change is made.

Also, the detailed setting as described above is held by each individual member printer driver, so the contents are updated whenever a change is made. Therefore, even when an operator wants to temporarily change the setting, the changed setting is saved, and the operator must reset the setting when executing next printing.

Furthermore, only the setting of the group printer driver can be registered even with the use of the function "favorite" described in Japanese Patent Laid-Open No. 2000-222159. Accordingly, the aforementioned detailed settings of the member printer drivers must be individually set.

In the conventional mechanism as described above, composite setting information collectively indicating a plurality of printing settings, e.g., the paper size and printing resolution, set via a plurality of setting sheets, is saved via a predetermined printer driver UI. When a plurality of printer drivers are to be set for printing in this mechanism, it is necessary to open each member printer driver to select the composite setting information saved in the printer driver. This forces a user to perform a very cumbersome operation.

SUMMARY OF THE INVENTION

The present invention has been made in consideration of the above situation, and has as its object to provide a mechanism which can realize efficient printing setting for a plurality of printer drivers.

According to the present invention, the foregoing object is attained by providing a printing control method using a virtual printer capable of comprehensively controlling a plurality of printer drivers, comprising the registration step of registering printing setting information set in all or some of the plurality of printer drivers, as reusable composite printing setting information.

According to another aspect of the present invention, the foregoing object is attained by providing a printing control method comprising: the recognition step of recognizing composite printing setting information selected from a list in which a plurality of pieces of composite printing setting information indicating setting information for a plurality of printer drivers are registered; and the setting step of setting, for a plurality of member printer drivers, contents based on the selected composite printing setting information recognized in the recognition step.

In still another aspect of the present invention, the foregoing object is attained by providing a printing control method using a virtual printer capable of comprehensively controlling a plurality of printer drivers, comprising: the acquisition step of acquiring a plurality of printing setting data structures which are provided by an OS and in which pieces of printing setting information of the plurality of printer drivers are set; and the registration step of registering the plurality of acquired printing setting data structures as printing setting information of the virtual printer.

In still another aspect of the present invention, the foregoing object is attained by providing a printing control method using a virtual printer capable of comprehensively controlling a plurality of printer drivers, comprising: the recognition step of recognizing composite printing setting information selected from a list in which a plurality of pieces of composite printing setting information indicating a plurality of pieces of setting information of the virtual printer are set; and the setting control step of performing control, on the basis of the selected composite printing setting information recognized in the recognition step, so as to read out a plurality of pieces of setting information of the plurality of printer drivers and set the plurality of readout setting information for respective corresponding printer drivers.

In still another aspect of the present invention, the foregoing object is attained by providing a printing control apparatus having a virtual printer capable of comprehensively controlling a plurality of printer drivers, comprising registering means for registering printing setting information set in all or some of the plurality of printer drivers, as reusable composite printing setting information.

In still another aspect of the present invention, the foregoing object is attained by providing a printing control apparatus comprising: recognizing means for recognizing composite printing setting information selected from a list in which a plurality composite printing setting information indicating setting information for a plurality of printer drivers are registered; and setting means for setting, for a plurality of member printer drivers, contents based on the selected composite printing setting information recognized by the recognizing means.

In still another aspect of the present invention, the foregoing object is attained by providing a printing control apparatus using a virtual printer capable of comprehensively controlling a plurality of printer drivers, comprising: acquiring means for acquiring a plurality of printing setting data structures which are provided by an OS and in which pieces of printing setting information of the plurality of printer drivers are set; and registering means for registering the plurality of acquired printing setting data structures as printing setting information of the virtual printer.

In still another aspect of the present invention, the foregoing object is attained by providing a printing control apparatus having a virtual printer capable of comprehensively controlling a plurality of printer drivers, comprising: recognizing means for recognizing composite printing setting information selected from a list in which a plurality of pieces of composite printing setting information indicating a plurality of pieces of setting information of the virtual printer are set; and setting control means for performing control, on the basis of the selected composite printing setting information recognized by the recognizing means, so as to read out a plurality of pieces of setting information of the plurality of printer drivers and set the plurality of readout setting information for respective corresponding printer drivers.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a view showing the way the group printer driver is set in the embodiment;

FIG. 21 is a view showing an example of the favorite data configuration generated by the process shown in FIG. 20.

DETAILED DESCRIPTION OF THE PREFERRED EMBODIMENTS

Preferred embodiments of the present invention will now be described in detail in accordance with the accompanying drawings.

First Embodiment

Figure 1:
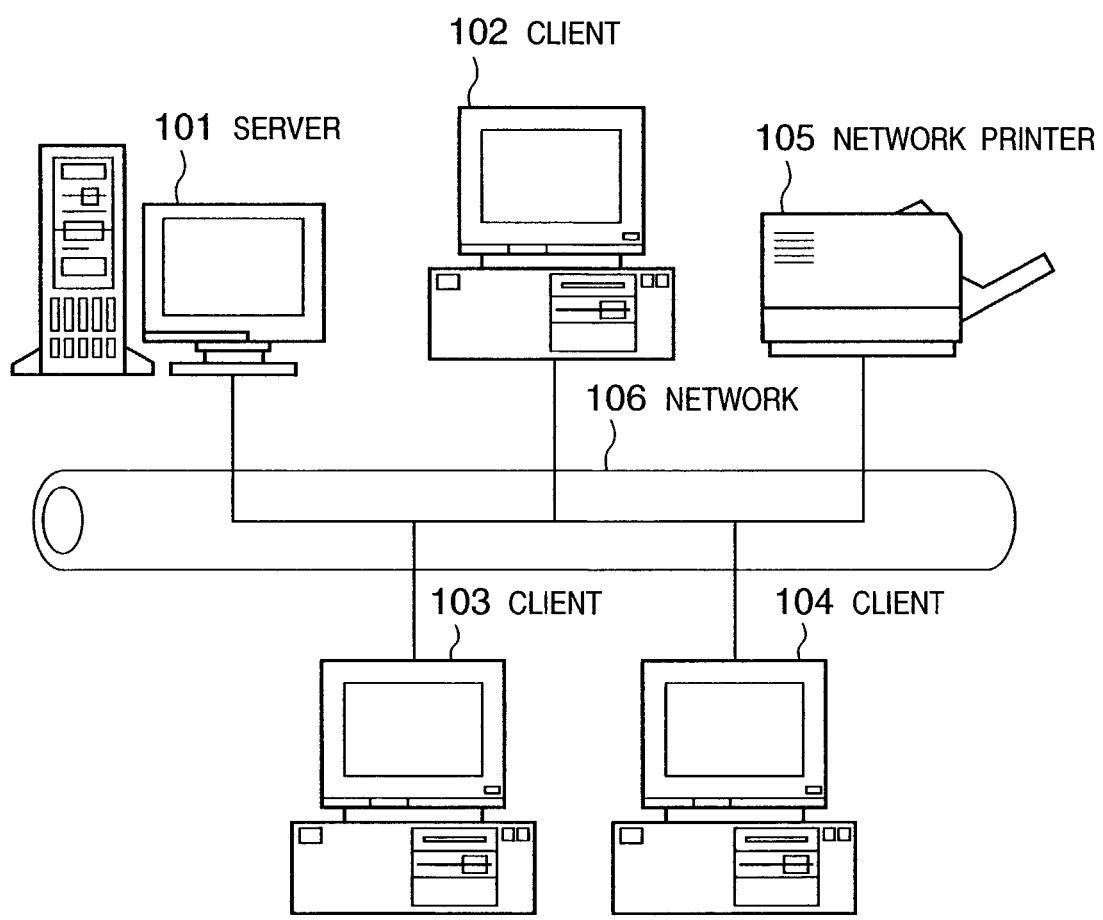
FIG. 1 is a block diagram for explaining the configuration of an image processing system to which the present invention is applicable.

FIG. 1 is a block diagram for explaining the configuration of an information processing system to which the present invention is applicable. In this system, one or a plurality of client computers are connected.

Referring to FIG. 1, reference numerals 102, 103, and 104 denote information processing apparatuses (to be referred to as client computers hereinafter) as clients. These client computers 102, 103, and 104 are connected to a network 106 by a network cable such as Ethernet (registered trademark), and can execute various programs such as application programs. Each client has a printer driver capable of converting printing data into a printer language corresponding to the printer. Note that this system supports a plurality of printer drivers. That is, a plurality of printers can be registered in the system, and member printer drivers can be those provided by a plurality of manufacturers.

Reference numeral 101 denotes an information processing apparatus (to be referred to as a print server hereinafter) as a server of this embodiment. This print server 101 is connected to the network 106 by the network cable to store files to be used in the network 106 and monitor the use state of the network 106. The print server 101 manages a plurality of printers connected to the network 106.

Note that the client computers 102 to 104 and print server 101 are general information processing apparatuses, and printing control programs for performing different control operations are stored in an executable manner in each client computer and the print server. The print server 101 can also have the function as a client at the same time.

The print server 101 of this embodiment further has the following functions. That is, the print server 101 (1) stores and prints out print jobs containing printing data and output from the client computers 102, 103, and 104; (2) receives job information not containing printing data from the client computers 102, 103, and 104, manages the printing order of these client computers 102, 103, and 104, and notifies permission of transmission of a print job containing printing data to a client whose turn has come; and (3) acquires various kinds of information such as the status and print jobs of a network printer 105, and notifies the client computers 102, 103, and 104 of the acquired information.

Reference numeral 105 denotes a network printer as a printing controller which is connected to the network 106 via a network interface (not shown). This network printer 105 receives across the network 106 a print job containing printing data and transmitted from a client computer, analyzes the print job and converts it into dot images page by page, and prints the images page by page. The network 106 connects the client computers 102, 103, and 104, server 101, network printer 105, and the like.

Figure 2:
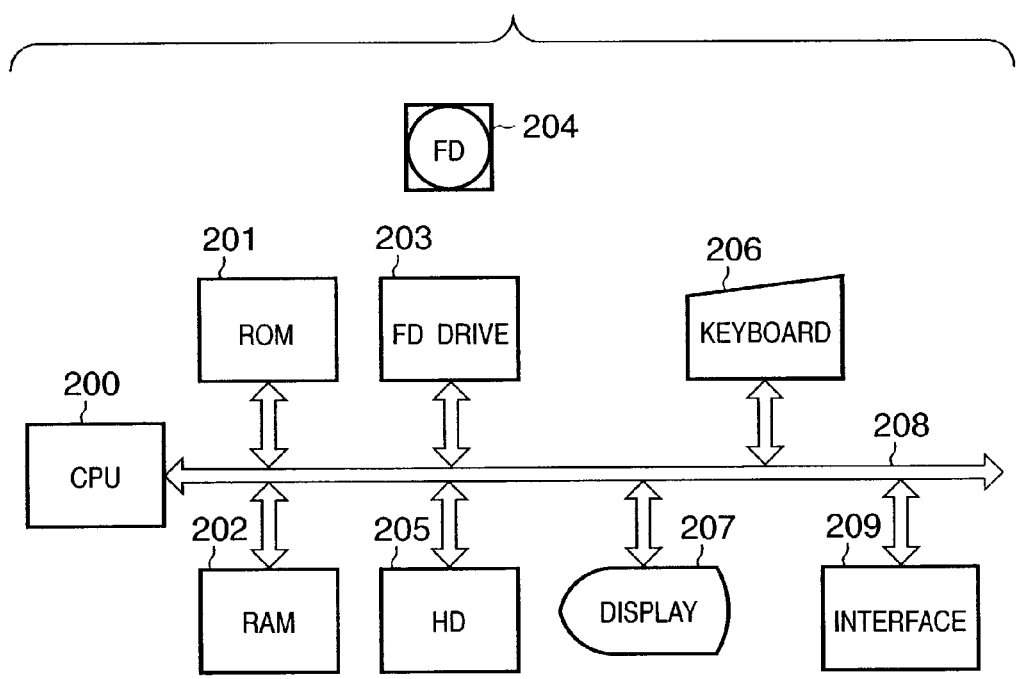
FIG. 2 is a block diagram for explaining the arrangement of an information processing apparatus of an embodiment.

FIG. 2 is a block diagram for explaining the arrangement of the information processing apparatus of this embodiment. The client computers 102, 103, and 104 are information processing apparatuses and each have the arrangement shown in FIG. 2. Also, the print server 101 has a hardware configuration similar to or equivalent to the arrangement shown in FIG. 2. In the following description, therefore, FIG. 2 will be explained as a block diagram which explains the configurations of both the client and server.

Referring to FIG. 2, reference numeral 200 denotes a CPU as a control means of the information processing apparatus. This CPU 200 executes, e.g., an application program, printer driver program, OS, and network printer control program of this embodiment stored in a hard disk (HD) 205. The CPU 200 also temporarily stores information necessary to execute programs, files, and the like in a RAM 202.

A ROM 201 as a storage means stores programs such as a basic I/O program and various data such as font data and template data used in document processing. The RAM 202 as a temporary storage means functions as, e.g., a main memory and work area of the CPU 200.

Figure 5:
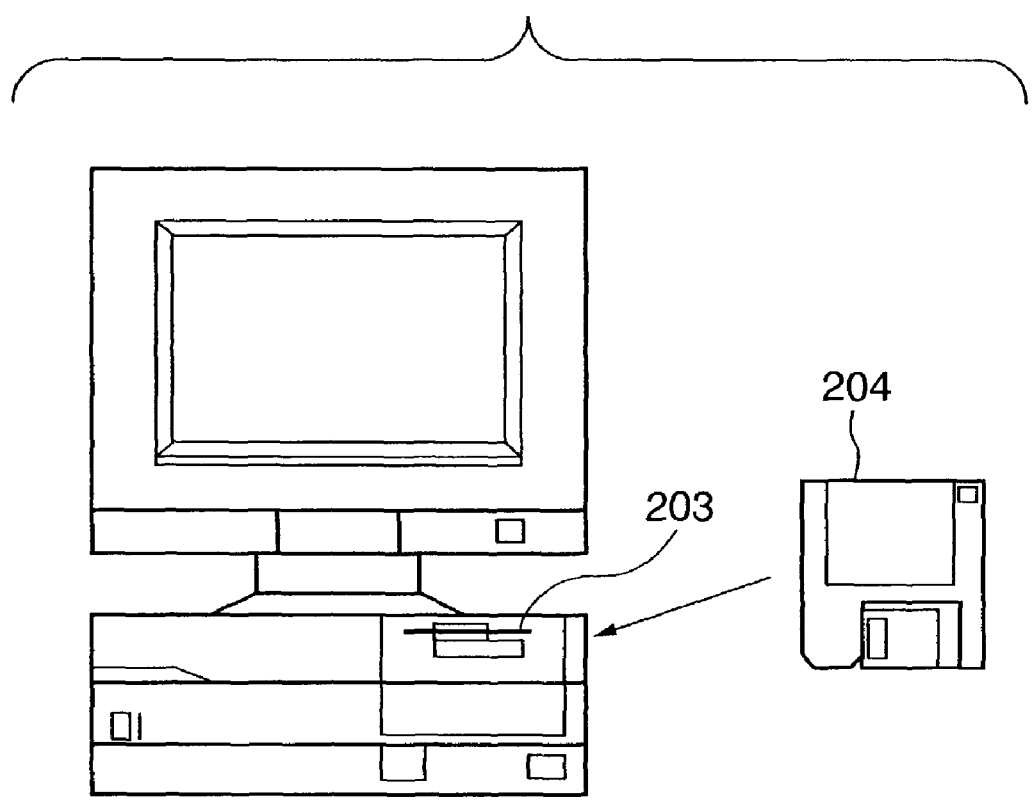
FIG. 5 is a view showing the FD 204 inserted into an FD drive 203 shown in FIG. 2.

Reference numeral 203 denotes a floppy (registered trademark) disk (FD) drive as a storage medium reading means. As shown in FIG. 5 (to be described later), a program and the like stored in an FD 204 as a storage medium can be loaded into this computer system via the FD drive 203. Note that the storage medium need not be an FD but can be any of, e.g., a CD-ROM, CD-R, CD-RW, PC card, DVD, IC memory card, MO, and memory stick. The floppy disk 204 is a storage medium storing a computer-readable program.

Reference numeral 205 denotes a hard disk (HD) which is an external storage means and functions as a large-capacity memory. This HD 205 stores an application program, printer driver program, OS, network printer control program, related program, and the like. A spooler as a spooling means is also stored in this HD 205. The spooling means is a client spooler in each client and a server spooler in the print server. In the print server, a table for storing job information received from the clients and performing sequence control is also stored in this external storage means.

Reference numeral 206 denotes a keyboard as an instruction input means. From a user to each client computer, or from an operator or manager to the print server, a command such as a device control command is input by this keyboard 206. A display 207 as a display means displays a command input from the keyboard 206, the status of the printer, and the like. A system bus 208 allows data to flow in computers as the clients and print server. Reference numeral 209 denotes an interface as an input/output means via which the information processing apparatus exchanges data with an external apparatus. This interface 209 is, e.g., a network interface, and connects the network 106 and the system bus 208.

Figure 3:
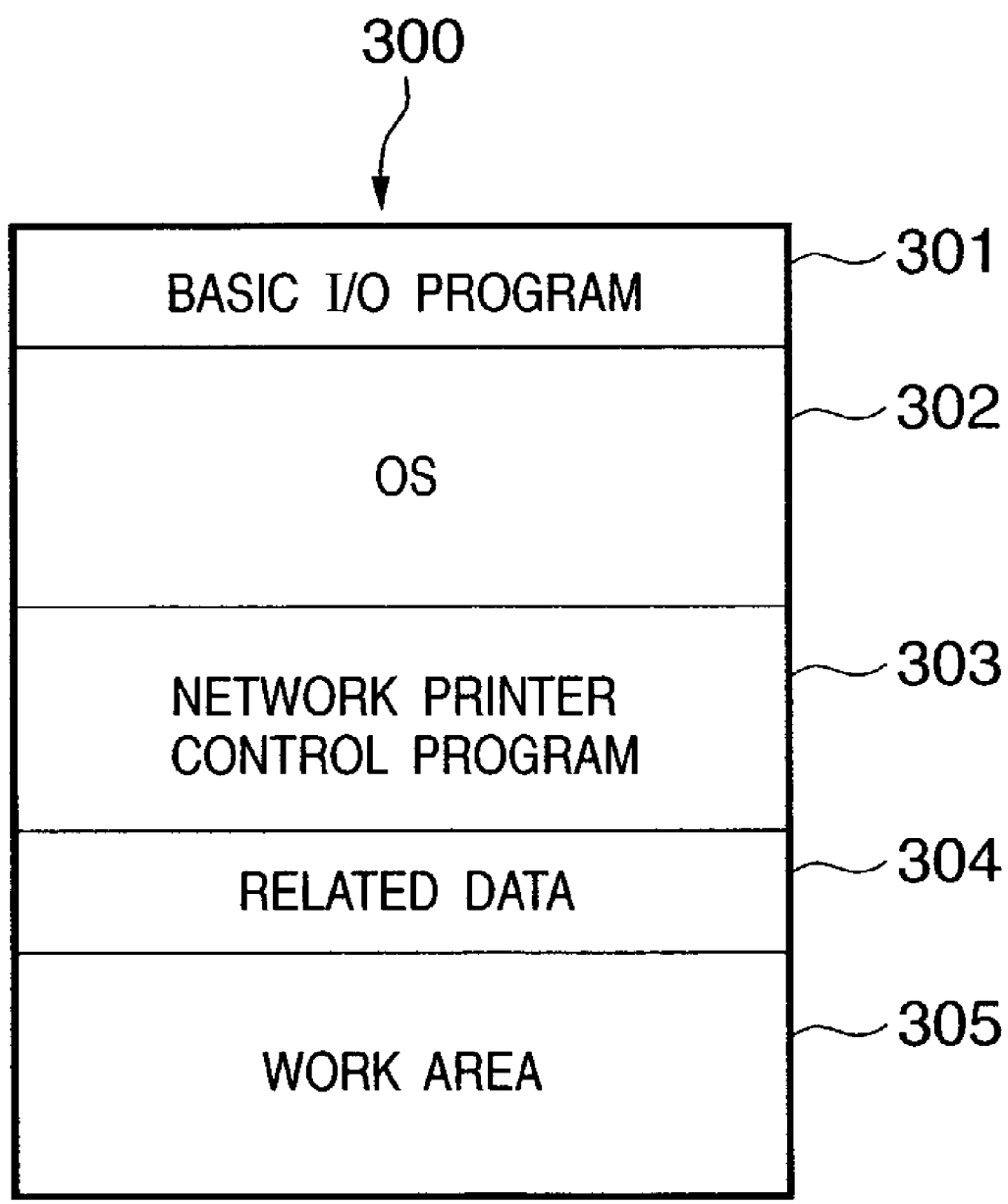
FIG. 3 is a view showing an example of a memory map in a RAM 202 shown in FIG. 2.

FIG. 3 is a view showing an example of a memory map in the RAM 202 shown in FIG. 2. This is a memory map when the network printer control program is loaded into the RAM 202 from the FD 204 and made executable. In this embodiment, the network printer control program and related data are loaded from the FD 204 directly into the RAM 202. However, whenever the network printer control program is operated, this network printer control program can be loaded from the HD 205, in which the control program is installed, into the RAM 202.

Also, the medium storing this network printer control program can be a CD-ROM, CD-R, PC card, DVD, or IC memory card, as well as an FD. Furthermore, this network printer control program can be stored in the ROM 201 to form part of the memory map and directly executed by the CPU 200. Alternatively, software which implements functions equal to those of the apparatuses described above can be used as a substitute for the hardware.

The network printer control program will be simply called a printing control program in some cases. In each client, this printing control program includes programs for designating a change of the printing destination of a print job and a change of the printing order. In the print server, the printing control program includes programs for performing print job sequence control and notifying the end of a print job and a printing destination change request.

The printing control program of this embodiment for performing the above control can be divided into a module to be installed in each client and a module to be installed in the print server. One printing control program can also function as a program for a client or as a program for the print server, in accordance with the environment in which it is executed. Alternatively, it is also possible to install, in a single computer, both a module having the functions as a client and a module having the functions as the print server, and simultaneously or time-divisionally operate these modules in parallel in a pseudo manner.

Referring to FIG. 3, a basic I/O program 301 has, e.g., an IPL (Initial Program Loading) function of loading the OS from the HD 205 into the RAM 202 and starting the operation of the OS, when this control apparatus is powered on. An operating system (OS) 302 and a network printer control program 303 are stored in areas secured on the RAM 202. Related data 304 is stored in an area secured on the RAM 202. Furthermore, a work area 305 is used by the CPU 200 as a temporary data storage area and the like when the CPU 200 executes this printer control program.

Figure 4:
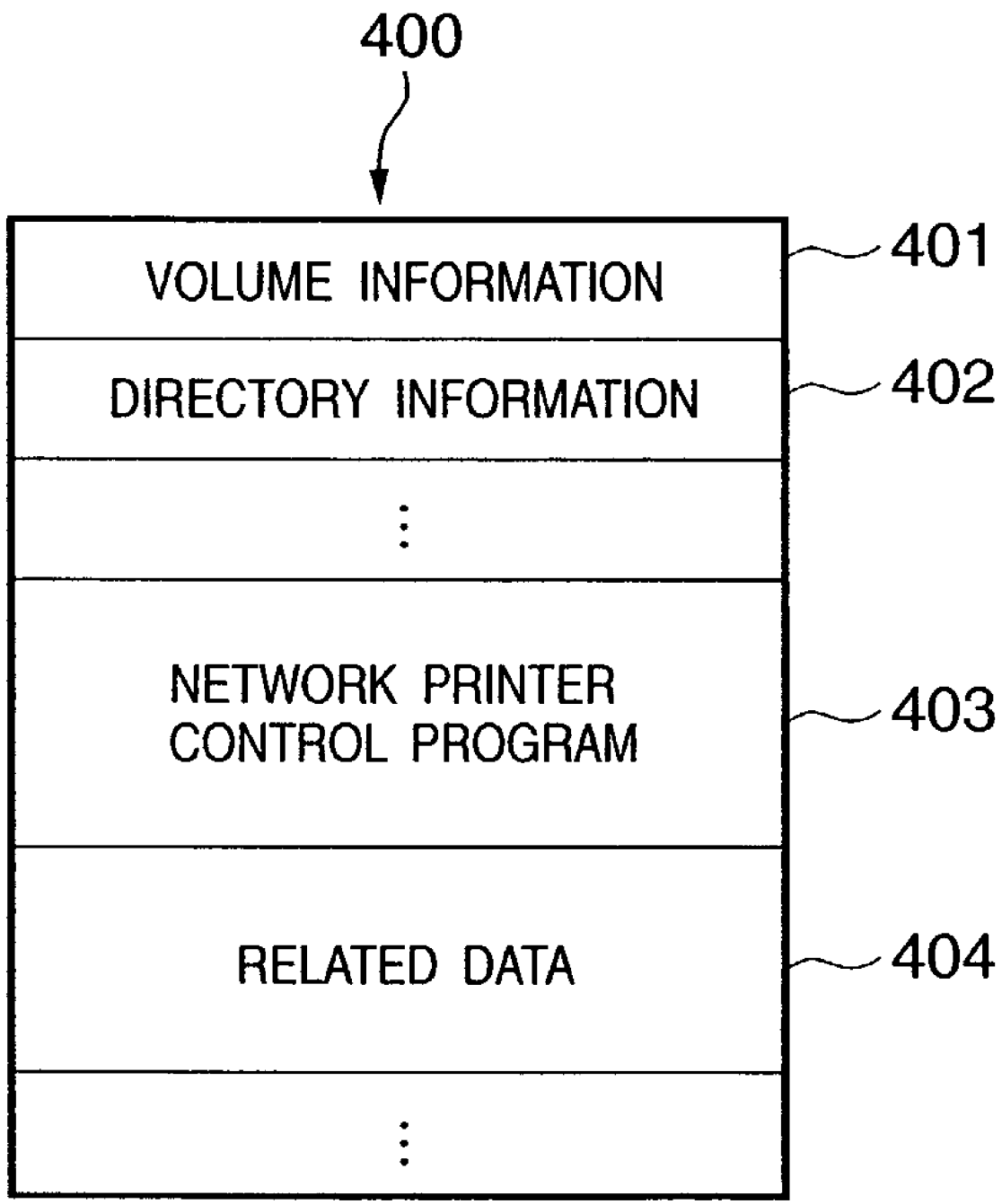
FIG. 4 is a view showing an example of a memory map in an FD 204 shown in FIG. 2.

FIG. 4 is a view showing an example of a memory map in the FD 204 shown in FIG. 2. Referring to FIG. 4, reference numeral 401 denotes volume information indicating the information of data; 402, directory information; 403, a network printer control program as the printing control program explained in this embodiment; and 404, related data of the network printer control program 403. This network printer control program 403 is formed on the basis of flow charts explained in this embodiment, and has the same configuration for both a client and the server in this embodiment.

FIG. 5 is a view showing the FD 204 inserted into the FD driver 203 shown in FIG. 2. The same reference numerals as in FIG. 2 denote the same parts in FIG. 5. As described above with reference to FIG. 4, the network printer control program explained in this embodiment and related data are stored in the FD 204.

The print job control system of this embodiment which performs a printing process such as distributed, broadcast, or print job redirecting printing by using a plurality of printers will be described below. In this embodiment, a plurality of printers are virtually bound as one printer called a group printer (virtual printer), and the individual bound printers are called member printers. Also, corresponding printer drivers are called a group printer driver and member printer driver. A member printer driver is software which generates PDL data interpretable by a printer, and a member printer has a predetermined port corresponding to the printer driver software.

Figure 6:
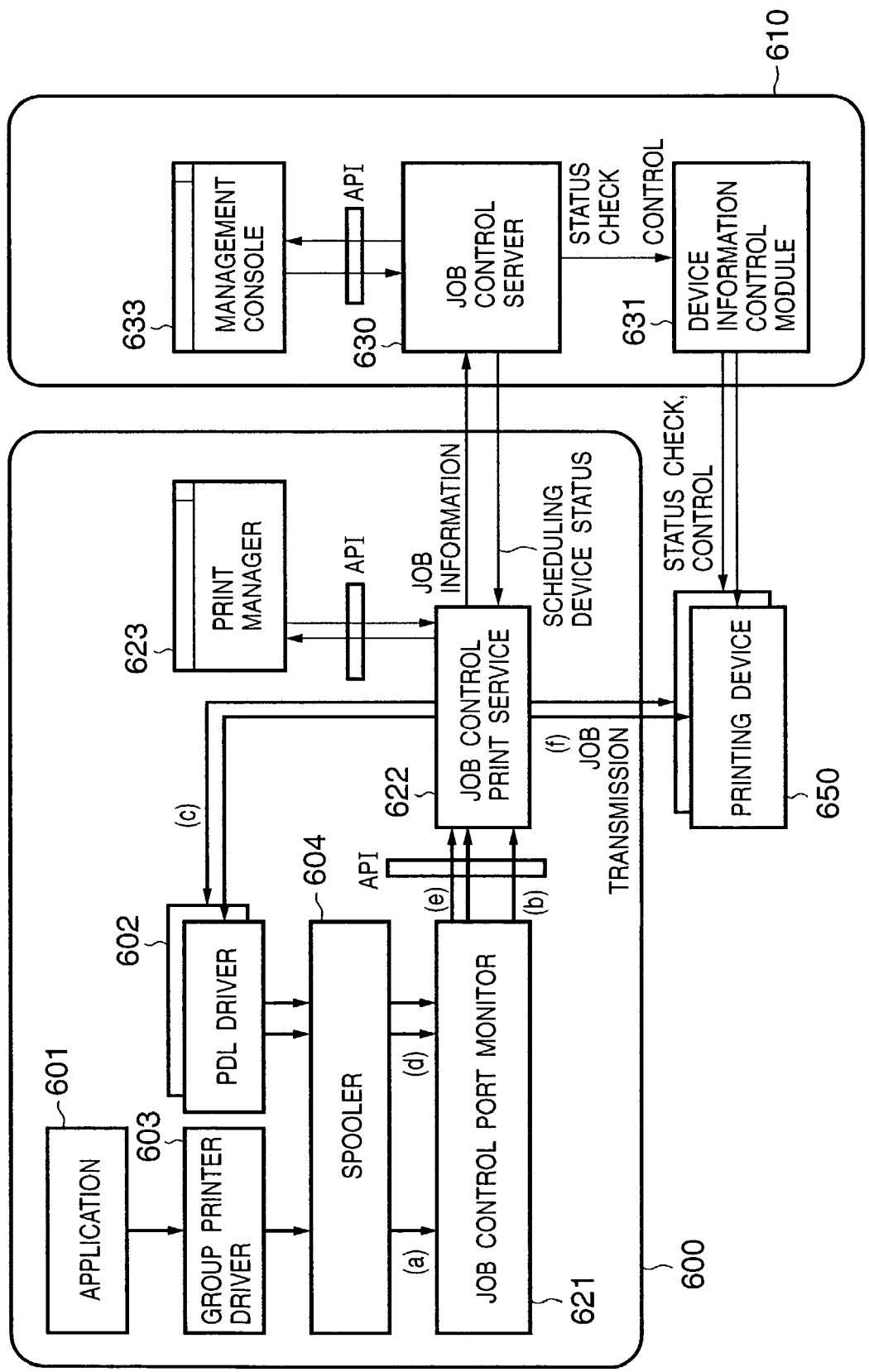
FIG. 6 is a block diagram for explaining a print control module configuration of the information processing apparatus of the embodiment.

FIG. 6 is a view showing the way a print job issued by a general application such as Microsoft Word (trademark) is processed in the print job control system in a client-server model of this system. In FIG. 6, a client computer 600 (corresponding to 102 to 104 in FIG. 1) is a machine in which the client module of the print job control system of this embodiment operates. Also, a print server 610 corresponds to 101 in FIG. 1.

Generally, when printing is designated, the application program generates a series of drawing commands (GDI functions), and these drawing commands (DDI functions) converted via the OS are transferred to the printer driver. On the basis of the input drawing commands from the OS, the printer driver generates a printer control language (PDL) interpretable by the printer. This printer control language is transferred as a print job (to be also referred to as print job data hereinafter) bound by JL (Job Language) to a print spooler (e.g., WindowsSpooler) provided by the OS. This print spooler follows the procedure in which the print job data is transferred to a port monitor selected by the user and transmitted to the printing device.

In contrast, in this embodiment the user designates printing by designating a print job control system port monitor 621 (to be abbreviated as a job control port monitor hereinafter) beforehand. An application program 601 receives the printing instruction and generates a series of drawing commands. A group printer driver 603 receives the drawing commands and generates a general-purpose printing file (to be described later). The group printer driver 603 transmits this general-purpose printing file as print job data to the job control port monitor 621, but not to a port monitor which transmits print job data to a printing device. In addition, the job control port monitor 621 transmits the print job data to a print job control system print service 622 (to be abbreviated as a job control print service hereinafter), but not to a printing device 650. The job control print server 622 performs print job control (to be described later) for the received print job data. Note that the print job data received by the job control print service 622 is not an actual print job but the general-purpose printing file as described above. As will be described later, a final print job is generated by control performed later.

A print job control system print manager 623 (to be abbreviated as a job control print manager hereinafter) is a program for providing a user interface (UI) by which the user checks the status of a print job in the job control print service 622 and operates the print job. The job control print manager 623 exchanges information and instructions with the job control print service 622 via the interface (API) of the software of this job control print service 622.

In the print server 610, a print job control system server 630 (to be abbreviated as a job control server hereinafter) performs centralized control (scheduling) for timings at which the job control print services 622 on the individual clients 600 transmit print job data to the printing devices 650. A print job control system management console 633 (to be abbreviated as a job control management console hereinafter) can monitor the whole print job control system by exchanging information and instructions with the job control server 630 via the API which the software of this job control server 630 accesses.

Also, the job control server 630 uses a device information control module 631 to communicate with each printing device 650, thereby acquiring information pertaining to a print job and the operating state of the printing device or operating the printing device. The acquired information can be transferred to the job control print service 622 of the client 600.

Printing from the group printer driver 603 in this embodiment will be explained below. The group printer driver 603 converts a series of drawing commands generated by the application program into a general-purpose printing file which has an intermediate format independent of the type of printing device. The format of this general-purpose printing file will be described later.

As described previously, this general-purpose printing file is transmitted from the spooler 604 to the job control port monitor 621 (a) and to the job control print service 622 (b). In accordance with the type of job control to be performed for this print job, the job control print service 622 generates a drawing command on the basis of the general-purpose printing file (c). The PDL driver 602 converts this drawing command into a PDL file interpretable by the printing device 650. Referring to FIG. 6, the job control print service 622 performs job control which divides this print job into two jobs. The two member jobs generated are indicated by two arrows (c). The PDL file generated by the PDL driver 602 is transferred from the spooler 604 to the job control port monitor 621 (d) and to the job control print service 622 again (e). In accordance with instructions from the job control server 630, the job control print service 622 transmits the PDL print job data to the printing device 650 (f).

In accordance with instructions of a printing designating document (a printing designating field to be described later with reference to FIG. 8, also called a job ticket) in the general-purpose printing file, the job control print service 622 logically divides one general-purpose printing file into a plurality of print jobs and transmits them to different printing devices, or retransmits once transmitted print job data to another printing device. (c), (d), (e), and (f) in FIG. 6 indicate paths of print job data in this case.

On the other hand, when application software forms a general-purpose printing file and directly supplies this general-purpose printing file as a print job, the way of transfer of information to the group printer driver 603 and the contents of processing in the group printer driver 603 are different from a general application.

As described above, to transfer drawing information to the group printer driver 603, a general application calls the GDI function of Windows OS (Windows is a registered trademark of Microsoft Corp., U.S.A.) as in the case of a common printer driver, and the group printer driver 603 generates a general-purpose printing file accordingly. In contrast, an application which directly forms a general-purpose printing file already has a general-purpose printing file and supplies this general-purpose printing file to the group printer driver 603. The group printer driver 603 rewrites, if necessary, the internal printing designating document of the general-purpose printing file on the basis of a preset printing method, and transfers the file to the spooler 604.

Figure 8:
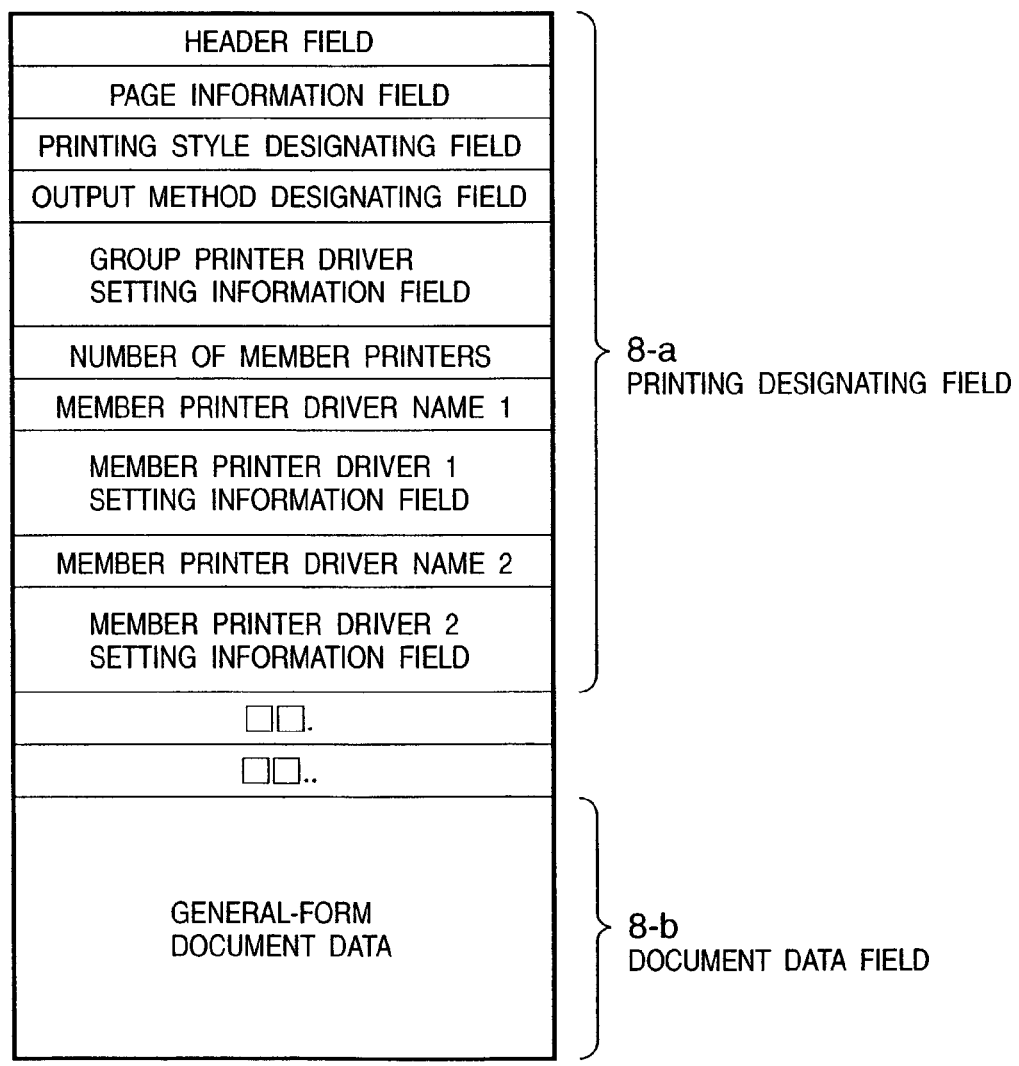
FIG. 8 is a view showing an example of the configuration of a general-purpose printing file of the embodiment.

FIG. 8 shows an example of the configuration of the general-purpose printing file. This general-purpose printing file used in this embodiment has a printing designating field 8-*a* and a document data field 8-*b*. The printing designating field 8-*a* describes document information and printing designation. The document data field 8-*b* converts document data of the application into general-form data, and has a data format independent of a printer language.

The printing designating field 8-*a* includes a header field, page information field, printing style designating field, output method designating field, group printer driver setting information field, the number of member printers (the number of member printer drivers), member printer driver names, and member printer driver setting information field. These fields will be explained below.

The "header field" stores information such as version identification of the file and file information. The "page information field" stores information such as the number of pages of document data in the document data field 8-*b*, and the size of each page. The "printing style designating field" stores information concerning the output style such as the range of pages to be printed, the number of copies, document data page layout information (N-UP or bookbinding printing), and staple designation or punch designation. The "output method designating field" stores information such as distributed printing, color-monochrome distributed printing, print job redirecting printing, and broadcast printing as output methods. The "group printer driver setting information field" stores printing setting information of the UI of the group printer driver (to be described later). The "number of member printers" stores the number of member printer drivers related by the group printer driver. The "member printer driver names" (identification information for identifying member printer drivers) stores the printer driver names of member printers. The "member printer driver setting information field" stores, e.g., DEVMODE information as printing setting information of the driver UI of a member printer driver. The "member printer driver names" and the "member printer driver setting information field" have storage areas corresponding to the number of member printers stored in the "number of member printers" described above.

To generate a general-purpose printing file, the group printer driver 603 explained with reference to FIG. 6 records the setting on the GUI provided by the group printer driver into the printing designating field 8-*a*. In addition, the group printer driver 603 converts data received from the application 603 by GDI into general-purpose data and records as document data in the document data field 8-*b* of this general-purpose printing file.

Note that the printing designating field 8-*a* and document data field 8-*b* of this general-purpose printing file can also be different files. In this case, the printing designating field exists as a printing designating document file, and the document data field exists as a document data file. These files can also be processed as a single file in the form of an archive.

The relationship between Print System provided by Windows and a print job in the print job control system and the contents of processing will be described in more detail below with reference to FIG. 7.

Figure 7:
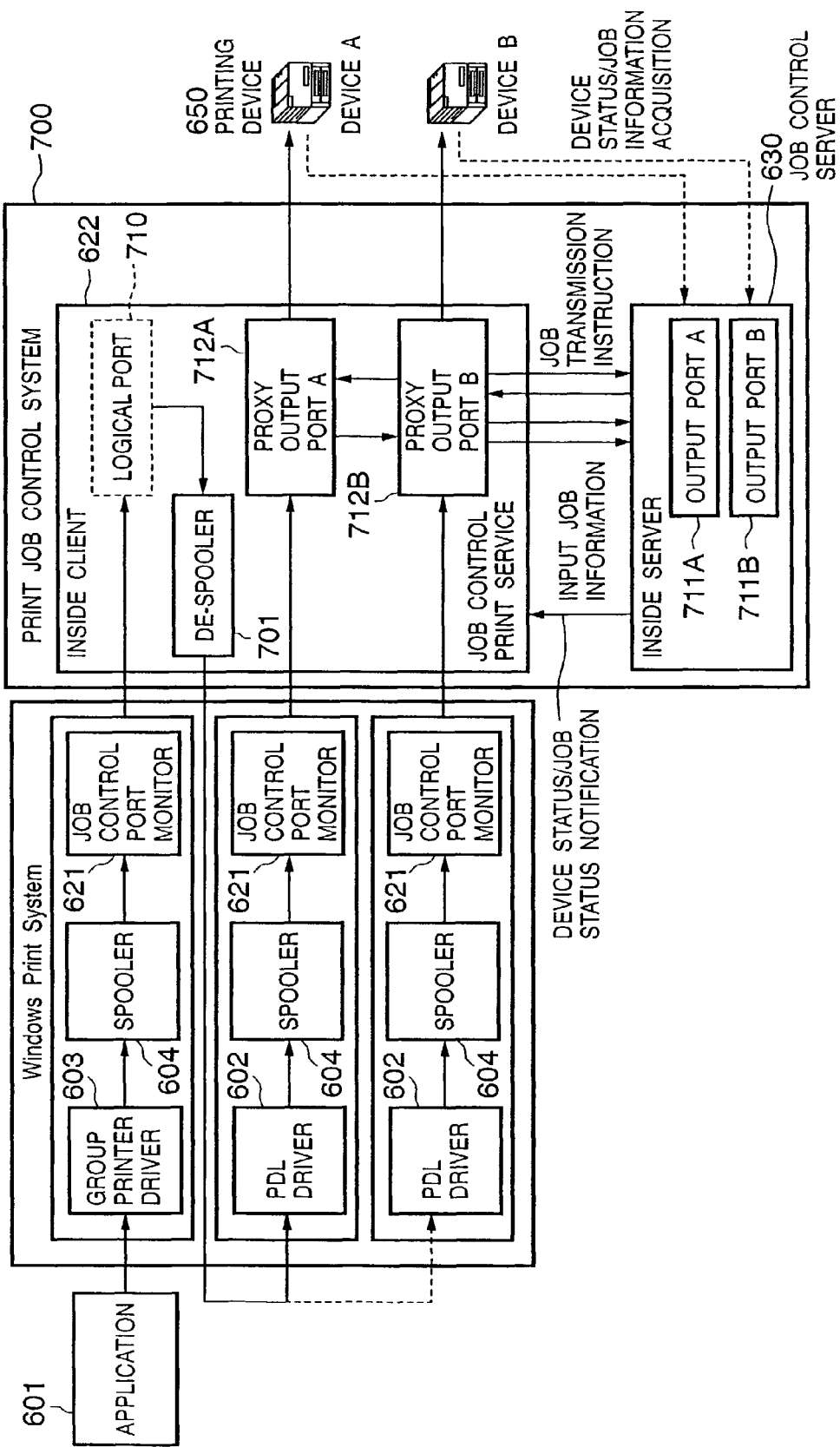
FIG. 7 is a block diagram for explaining the print control module configuration of the information processing apparatus of the embodiment.

Referring to FIG. 7, a print job control system 700 indicates the range of a print job control system across a physical machine in which control programs of the server and client operate. Output ports 711A and 711B managed by the server are related to proxy output ports 712A and 712B of the job control print service 622 of the client, and all proxy output ports of clients related to one port are collectively managed. In this embodiment, actual print job data is held in the proxy output port 712 of each client. The job control server 630 does not transmit print job data itself, but only instructs the job control print service 622 to transmit a print job. In accordance with the instruction, the job control print service 622 of the client transmits print job data to the device 650.

Processing when the print job control system 700 performs value-added printing such as print job redirecting printing, distributed printing, or broadcast printing will be explained.

As described previously, when the print job control system 700 performs value-added printing such as print job redirecting printing, distributed printing, or broadcast printing, the user or the application 601 must issue a print job to a printer to which the group printer driver 603 is allocated. The job control print service 622 receives the job data processed by the group printer driver 603, as a general-purpose printing file, via the job control port monitor 621 and a logic port 710. Upon receiving this job, the job control print service 622 issues, via a de-spooler 701, a job (member job) to another printer to which the PDL driver 602 is allocated, and causes this printer to print the job.

That is, the de-spooler 701 interprets the printing designating field 8-*a* of the general-purpose printing file explained with reference to FIG. 8, converts document data in the document data field 8-*b* into the GDI of Windows, instructs each printer driver to perform printing, and issues a print job. For example, when designation of 2-UP is recorded in the printing style designating field, the de-spooler 701 lays out document data of two pages on a sheet of paper in a reduced scale. In distributed printing or broadcast printing, the de-spooler 701 issues jobs to a plurality of member printer drivers described in the printing designating field 8-*a*, in accordance with the setting of the printing. In print job redirecting printing, when the substitute conditions are met the de-spooler 701 issues a member job in accordance with previous setting in the case of automatic substitution or with a user's operation in the case of manual substitution.

When the de-spooler 701 is to issue a job to each member printer driver, DEVMODE (data describing driver setting information and the like) of each member printer driver must be formed as a printing instruction to the member printer driver. This DEVMODE is generated by properly reflecting the contents described in the printing designating field 8-*a* on DEVMODE of each member printer driver.

The job control print service 622 of the client receives PDL data of each member job, rendered by the PDL driver 602, via the job control port monitor 621, and notifies the server of information concerning the received job. In addition, the job control print service 622 temporarily holds the job data in the proxy output ports 712A and 712B. After that, the job control print service 622 receives a transmission instruction from the job control server 630 and transmits the held print job to the printing device 650.

Control of the group printer driver for the print job control system in this embodiment of the present invention will be described below.

FIG. 15 is a view showing the way the group printer driver is set in this embodiment. More specifically, FIG. 15 shows the way the group printer driver is set when the print job control system is installed, or the way the setting of the group printer driver is changed in accordance with user' instructions.

As shown in FIG. 15, combinations of printer drivers A, B, and C, various set values for the individual member printer drivers, and, although not shown, output methods designated via the user interface displayed upon installation are stored as default values. Examples of the output methods are normal printing which causes a single normal specific printer to print data, and distributed printing, broadcast printing, color-monochrome distributed printing, and print job redirecting printing explained above.

Figure 16:
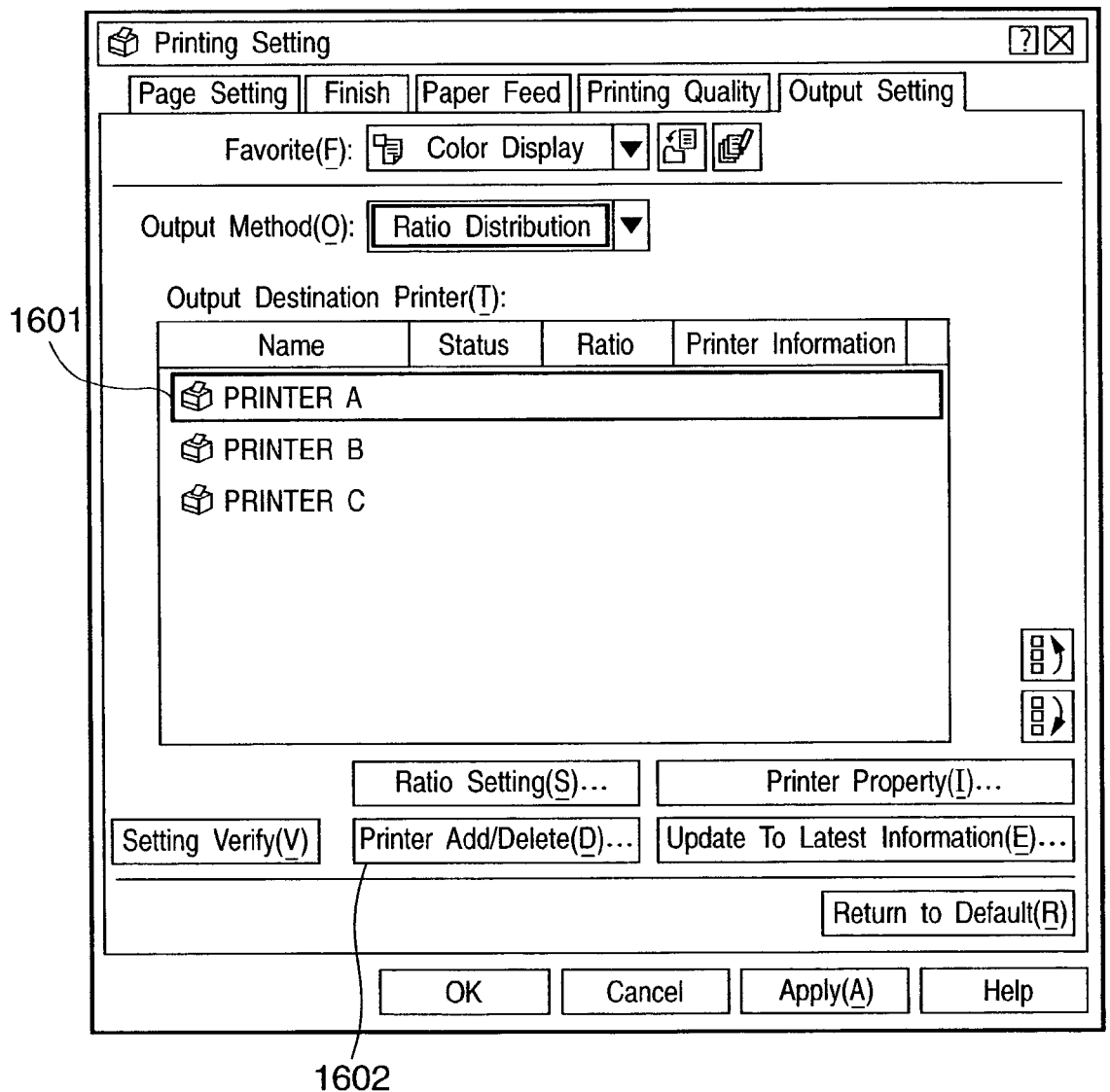
FIG. 16 is a view showing an example of the user interface of the group printer driver when the contents shown in FIG. 15 are set.

FIG. 16 shows an example of the user interface of the group printer driver when the contents as shown in FIG. 15 are set. Referring to FIG. 16, ratio distribution is designated as an output method. In 1601, printers A, B, and C are set as member printer drivers forming the group printer driver. Reference numeral 1602 denotes an operation button for designating addition/deletion of a member printer driver. For example, when this button 1602 is clicked while the printer A is selected as shown in FIG. 16, this printer A is deleted from the configuration of the member printer driver by this control program.

Figure 9:
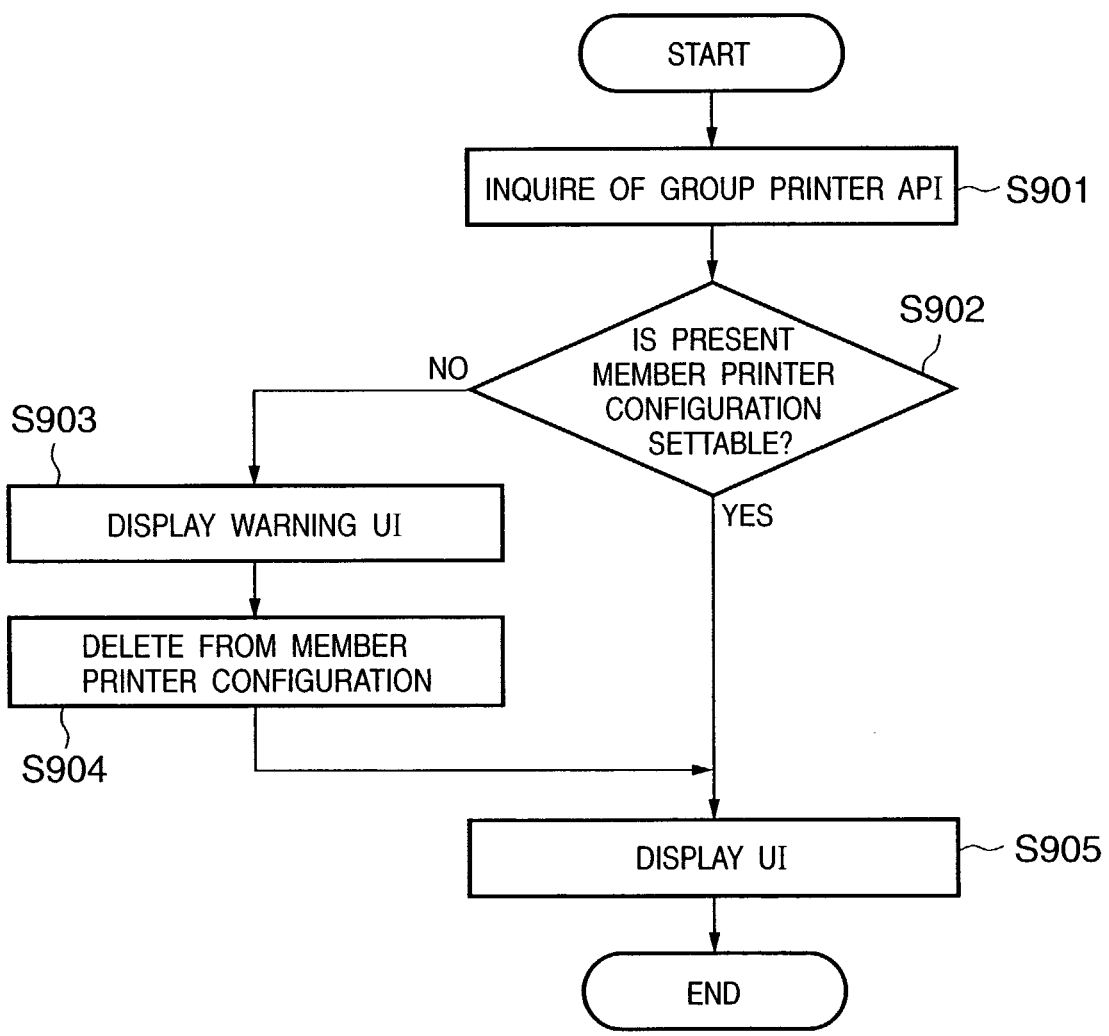
FIG. 9 is a flow chart showing the process control flow of the user interface of a group printer driver of the embodiment.

FIG. 9 is a flow chart showing the control flow of a group printer driver UI display process according to this embodiment. Processing in each step of this flow chart shown in FIG. 9 is implemented by a CPU (Central Processing Unit) of the information processing apparatus described above by loading a control program stored in a predetermined storage medium such as a ROM or FD or in a hard disk (HD), and executing processing based on the loaded program.

In step S901, if an application requests UI display via Windows System, the CPU uses the print job control system API to acquire member printer names usable by the group printer driver. The member printer driver names acquired in step S901 are a plurality of member printer drivers stored in the print job control system (group printer driver) when this processing in step S901 is executed. A method of acquiring a plurality of member printer drivers stored is not limited to the method using the member printer driver names. That is, any member printer driver identification information with which each member printer driver can be identified is applicable to the present invention.

In step S902, the member printer configuration (member printer identification information) which the group printer driver holds as default data is compared with the member printer names acquired in step S901. This processing in step S902 is equivalent to comparing the member printer driver configuration (member printer driver identification information) which the group printer driver holds as default data with member printer drivers stored as the entities of programs in the information processing apparatus. For example, when the group printer driver holds the three member printer driver names, i.e., the member printer drivers A, B, and C, as default values as shown in FIGS. 15 and 16, the processing in step S902 checks whether the entities of control programs of these member printer drivers A, B, and C are actually stored in a usable form in the information processing apparatus.

Figure 12:
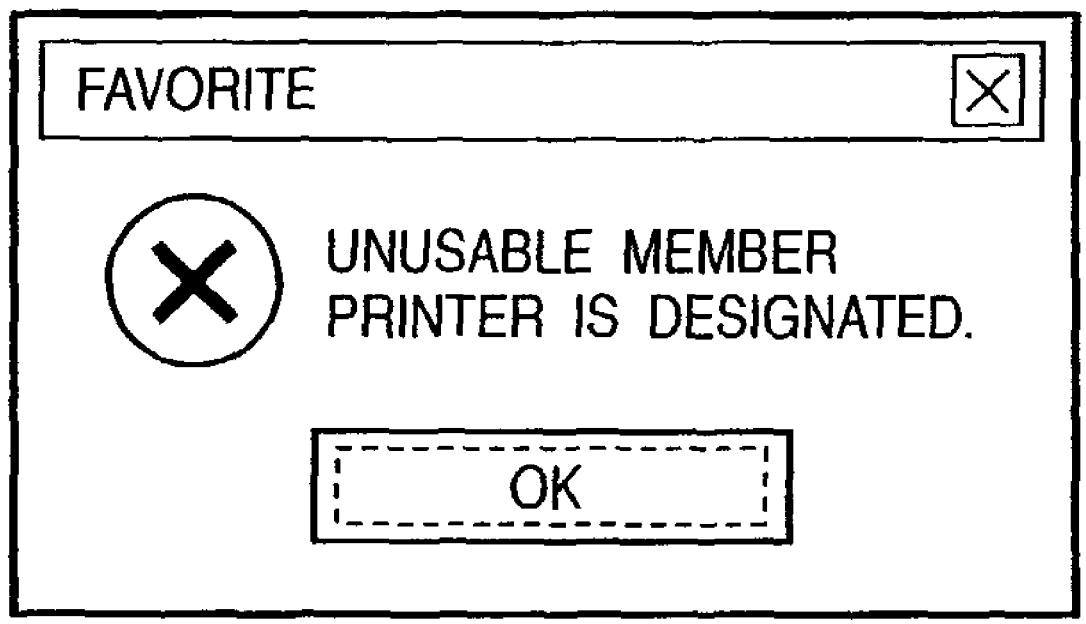
FIG. 12 is a view showing an example of warning display of the embodiment.

If the result of the comparison in step S902 indicates that any of these member printers is unusable in the print job control system, i.e., if it is determined that the entity of a member printer driver which the group printer driver holds as identification information is not stored in a usable form in the print job control system, the flow advances to step S903 to display a warning message as shown in FIG. 12. This display shown in FIG. 12 is obtained by displaying, on the display unit via the OS, the contents based on display information for displaying the user interface included in the print control program (including the group printer driver) of this embodiment. Other display contents in this embodiment are obtained by the same mechanism.

In step S904, the member printer driver found to be unusable is deleted from the present member printer driver configuration, and the process is continued.

After that, in step S905 the group printer driver UI is displayed.

Figure 10:
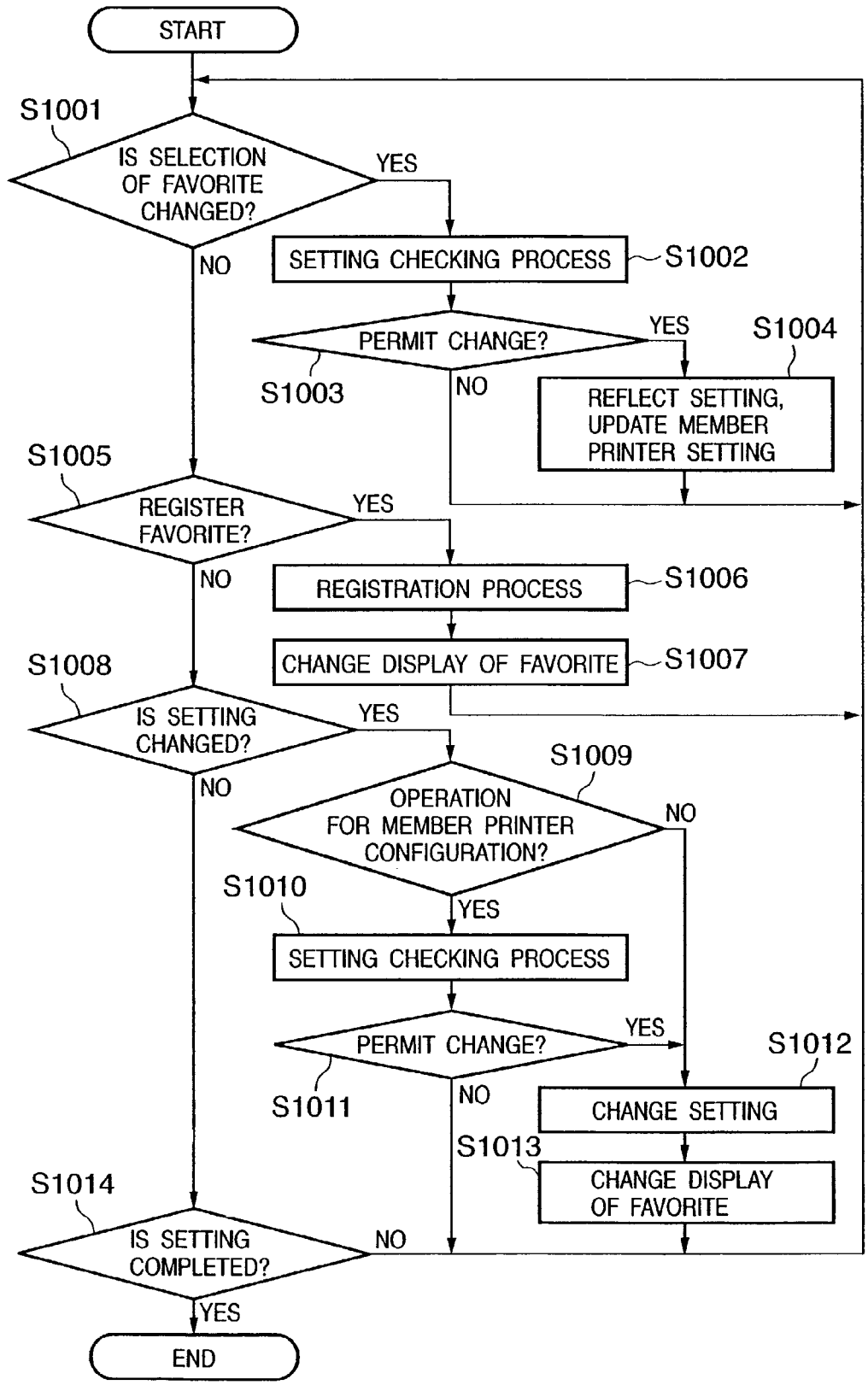
FIG. 10 is a flow chart showing the process control flow when a UI display process is performed by the group printer driver of the embodiment.

FIG. 10 is a flow chart showing a detailed operation of the UI display process (step S905) in FIG. 9. Note that processing in each step of this flow chart shown in FIG. 10 is implemented by the CPU (Central Processing Unit) of the information processing apparatus described above by loading a control program stored in a predetermined storage medium such as a ROM or FD or in a hard disk (HD), and executing processing based on the loaded program.

This processing shown in FIG. 10 will be explained with reference to FIG. 13 as an example of an actual user interface.

Figure 13:
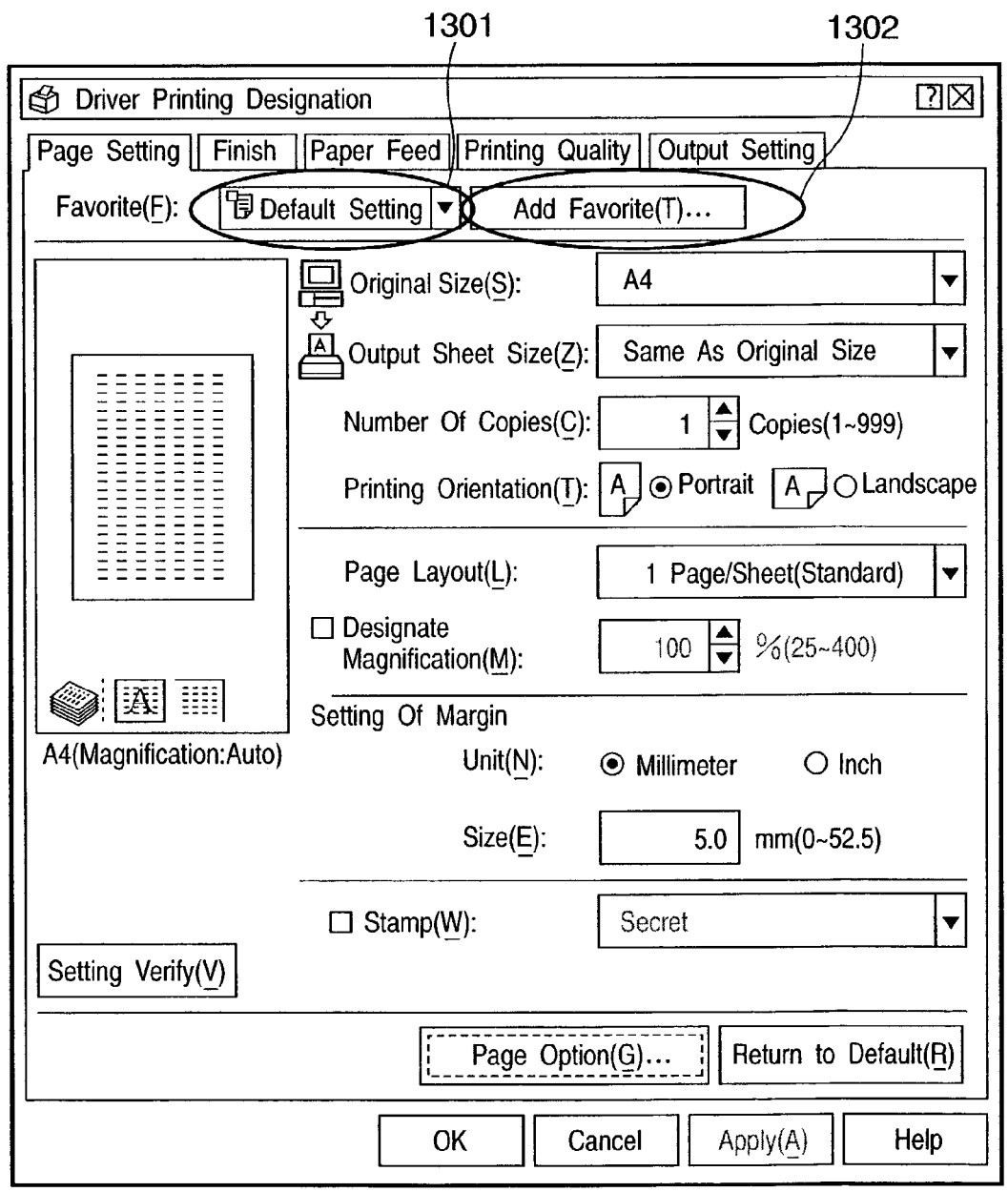
FIG. 13 is a view showing an example of the user interface of the embodiment.

First, in step S1001, a combo box list displayed as indicated by 1301 in FIG. 13 is designated by a user's operation, and the CPU checks whether "favorite" other than currently selected "favorite" is selected. In practice, before this UI is displayed, list information is generated which allows a plurality of registered "favorites" to be displayed in the form of a list from which the user can select any one of these favorites. When a click signal corresponding to the button 1301 shown in FIG. 13 is input, a list of one or a plurality of currently registered favorites is displayed, and the user can select a desired one of these favorites. In step S1001, the CPU checks whether another favorite is newly selected from the list. In this specification, "favorite" is composite printing setting information which registers printing setting information for a plurality of member printers.

If determining in step S1001 that the selection of favorite is changed, in step S1002 the CPU checks the setting by this "favorite" selection change. Details of step S1002 will be described later.

In step S1003, the CPU checks whether to permit the change made in step S1002. If YES in step S1003, in step S1004 the CPU changes control of all sheets in accordance with the new setting and also changes the setting of all member printers to the setting held in "favorite". If NO in step S1003, the CPU does not change the setting and returns the flow to step S1001.

On the other hand, if determining in step S1001 that the selection of "favorite" is not changed, the flow advances to step S1005. In step S1005, the CPU checks whether clicking of a "favorite addition button" as indicated by 1302 shown in FIG. 13 is input in accordance with an operator's instruction.

If determining in step S1005 that the addition button is clicked, in step S1006 the CPU performs a series of processes of registering favorite in accordance with the present setting. Set values registered (saved) as favorite setting in this present setting are set values of various items set via the user interface ("page setting" sheet) as shown in FIG. 13, combinations of member printer drivers set via the user interface ("output setting" sheet) as shown in FIG. 16 (in this embodiment, member printers can be added and deleted by operating a "printer add/delete" button 1602 on the output setting sheet), and set values set via different user interfaces displayed when, e.g., "finish", "paper feed", and "printing quality" sheets are selected.

In the favorite registration process, printing setting information including not only printing setting information set via the group printer driver UI but also printing setting information set via the individual UIs of different member printer drivers is registered with a name. This name may be input by the user or determined from the date/time or the setting contents. In this favorite registration, data based on the data structure of DEVMODE (containing both common setting items and extended setting items to be described later with reference to FIG. 15) is saved (copied). In this embodiment, as will be described later with reference to FIG. 21, DEVMODE of the group printer driver and DEVMODE of each member printer driver are collectively saved.

Figure 20:
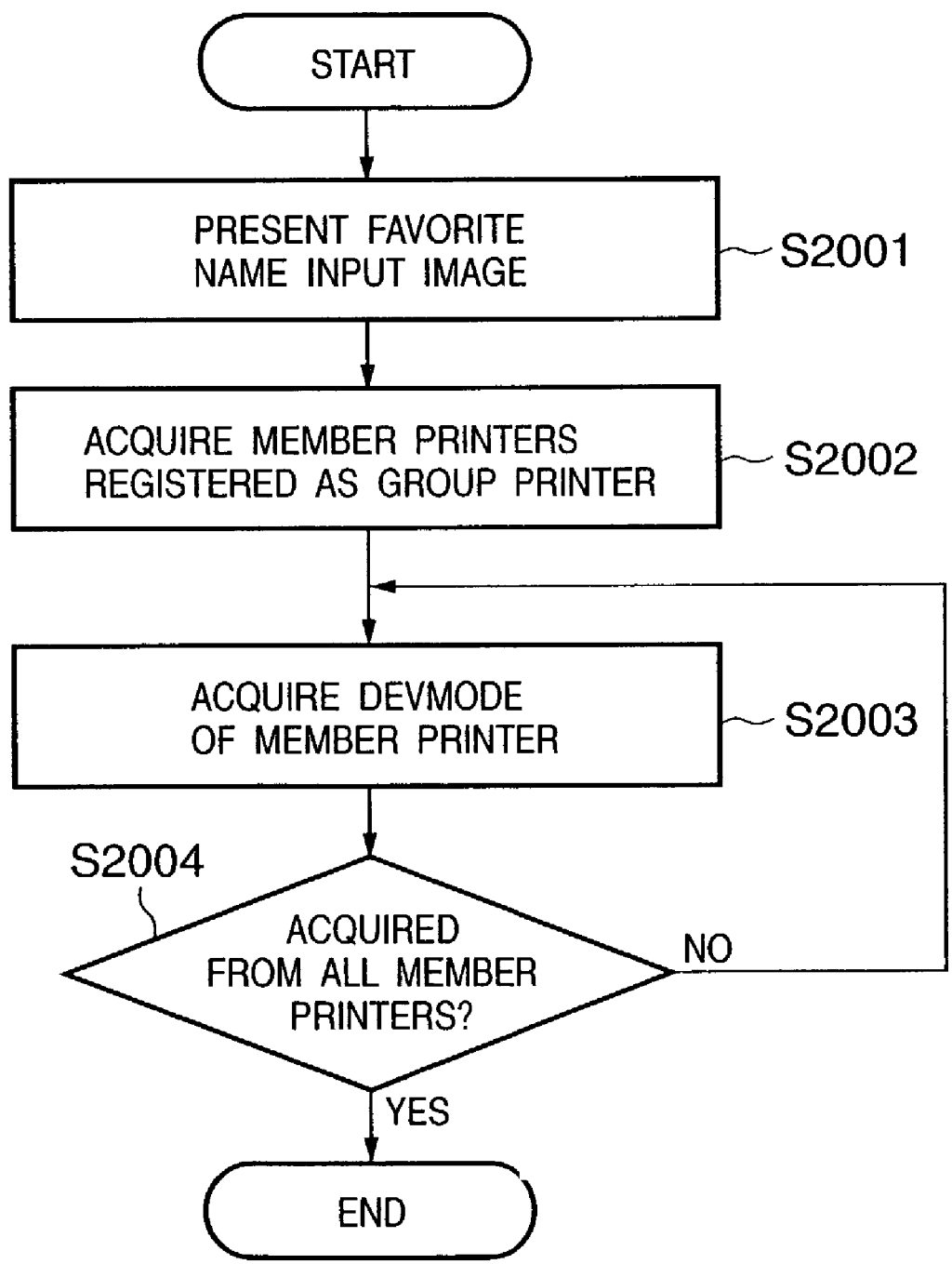
FIG. 20 is a flow chart for explaining a favorite registration process according to the embodiment.

FIG. 20 is a flow chart for explaining the favorite registration process according to this embodiment. When the button 1302 shown in FIG. 13 is clicked, in step S2001 a registration window (not shown) is displayed and the user is prompted to enter the name of favorite. When the name is entered, the flow advances to step S2002 to acquire member printers registered as the present group printer. For example, if the member printers A, B, and C are registered as explained with reference to FIG. 16, these printers A, B, and C are acquired in this step. At the same time, DEVMODE of the group printer is acquired and added to the favorite data. In steps S2003 and S2004, DEVMODEs of the member printers acquired in step S2002 are acquired in turn and additionally stored as information of this favorite in one-to-one correspondence with information for identifying the member printers.

FIG. 21 is a view showing an example of the data configuration of favorite generated by the process shown in FIG. 20. DEVMODE information is registered for the group printer and each member printer. DEVMODE of the group printer driver contains the setting of the print job control system, e.g., designation of a printing method such as distributed, print job redirecting, or broadcast printing, and a list of member printers, in addition to the set contents of the common setting items. When favorite is selected, therefore, the common setting items set by the group printer driver and the printing method are restored, and the registered DEVMODE information is transferred to the member printers A, B, and C (step S1004) and set for these member printers. Consequently, the state registered in the favorite is completely restored. The relationship between the configuration in FIG. 21 and the configuration in FIG. 15 is that the printer drivers A 1501 to C 1503 correspond to printer IDs and the set contents of the individual setting items correspond to DEVMODE information.

In steps S1001 to S1007, the configuration of member printers forming the group printer is registered for each "favorite". When a desired favorite is selected, printing set information recorded in this favorite is reflected on member printers registered in the favorite. For example, even when the group printer is currently operating by using the printer drivers A, B, and D as printer drivers, if the configuration of member printers of a newly selected favorite are A, B, and C, the member printer configuration is changed to A, B, and C at the time this favorite is selected. However, the member printer configuration need not be registered in "favorite". When this is the case, the printing setting information registered in favorite is reflected on member printer drivers usable at that time or on a member printer configuration set by another operation at that time. For example, if the group printer is currently operating by using the printer drivers A, B, and D as printer drivers, the printing setting information registered in the favorite is reflected on the printer drivers in this member configuration.

Subsequently, in step S1007, the CPU changes the display of "favorite" in 1301 such that the newly registered one is selectable, and returns the flow to step S1001.

If determining in step S1005 that the addition button 1302 is not clicked, the CPU checks in step S1008 whether the setting (e.g., the paper size) other than "favorite" is changed by a user's instruction. If determining in step S1008 that the setting is changed, the CPU checks in step S1009 whether the operation is to change the configuration, e.g., add or delete a member printer. If determining in step S1009 that the operation is to change the member printer driver configuration, the CPU checks in step S1010 whether the setting is possible and proceeds the flow to step S1011.

In step S1011, the CPU determines whether the configuration of member printer drivers can be changed. This determination process corresponds to the process in step S1002 explained in FIG. 11. That is, the CPU checks whether the individual member printer drivers in the changed member printer driver configuration are stored in a form by which this print job control program can actually use these printers. For example, if only the entities (including the printer driver names and control programs) of printer drivers corresponding to the names of the member printer drivers A, B, and C as shown in FIG. 15 are stored in a form by which this print job control program can use these entities, addition of a new member printer driver D is not permitted although simple deletion of a member printer driver is permitted.

If determining in step S1011 that the change is possible, the flow proceeds to step S1012.

If determining in step S1009 that the operation relates to a setting change other than a change in the member printer driver configuration (if NO in step S1009), the flow directly advances to step S1012 to change the designated setting. For example, the CPU changes the setting of any item shown in FIG. 15.

Figure 14:
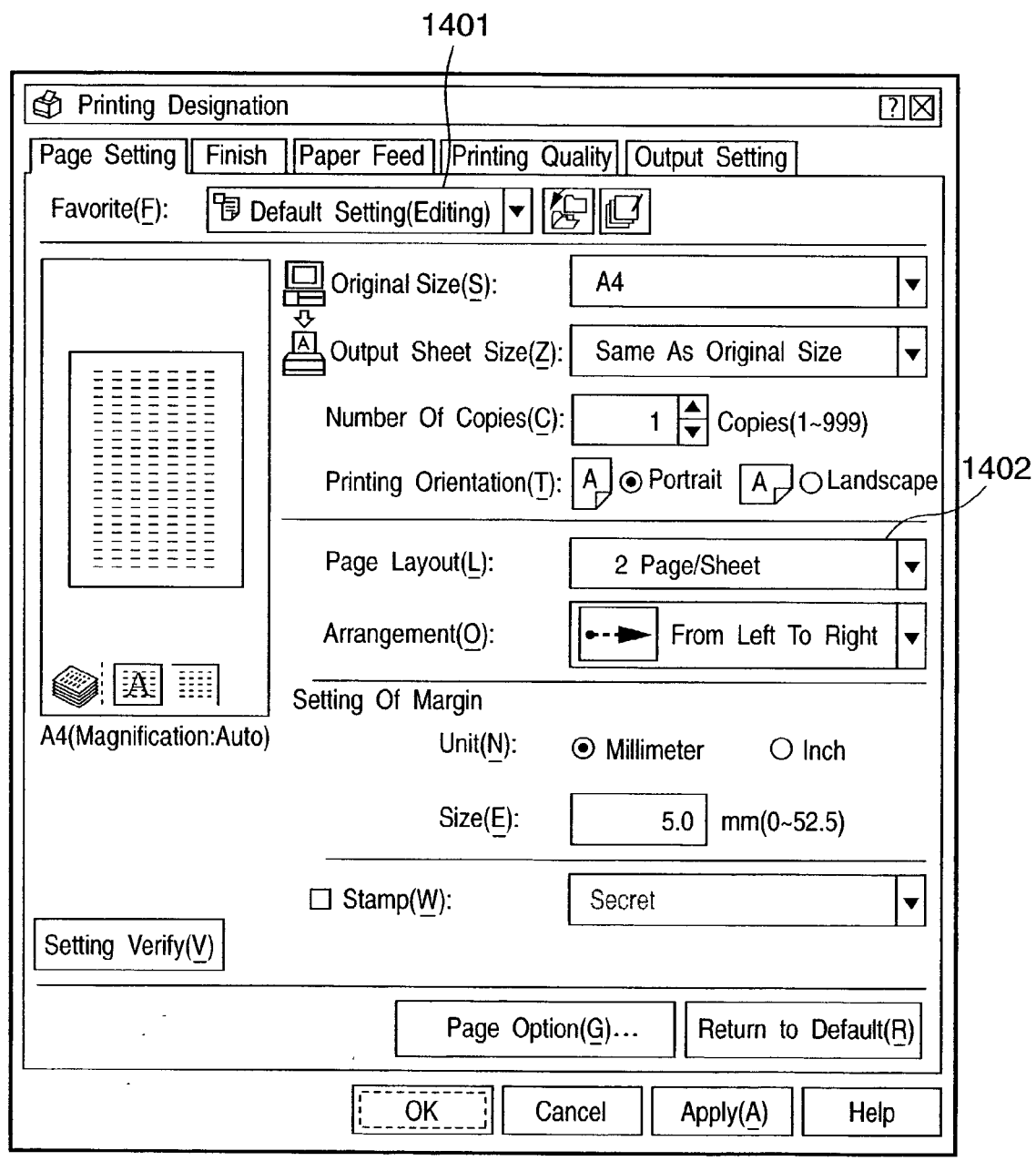
FIG. 14 is a view showing an example of the user interface of the embodiment.

As a result of the processing in step S1012, the set contents of "favorite" currently being selected are made different from the actual setting. To clearly indicate this, therefore, the UI display is changed (step S1013). More specifically, the color is changed from black to another color, or the icons are changed. FIG. 14 shows an example of the changed display. That is, if "1 page/sheet" is changed to "2 pages/sheet" as indicated by page layout 1402, the contents of the combo box list 1301 shown in FIG. 13 are changed as indicated by 1401. Also, if it is determined that the setting is thus changed, it is possible to prompt the user to newly register "favorite" including the changed setting.

The above determination is repeated until the user closes the dialogue, i.e., designates termination of the setting (step S1014).

Figure 11:
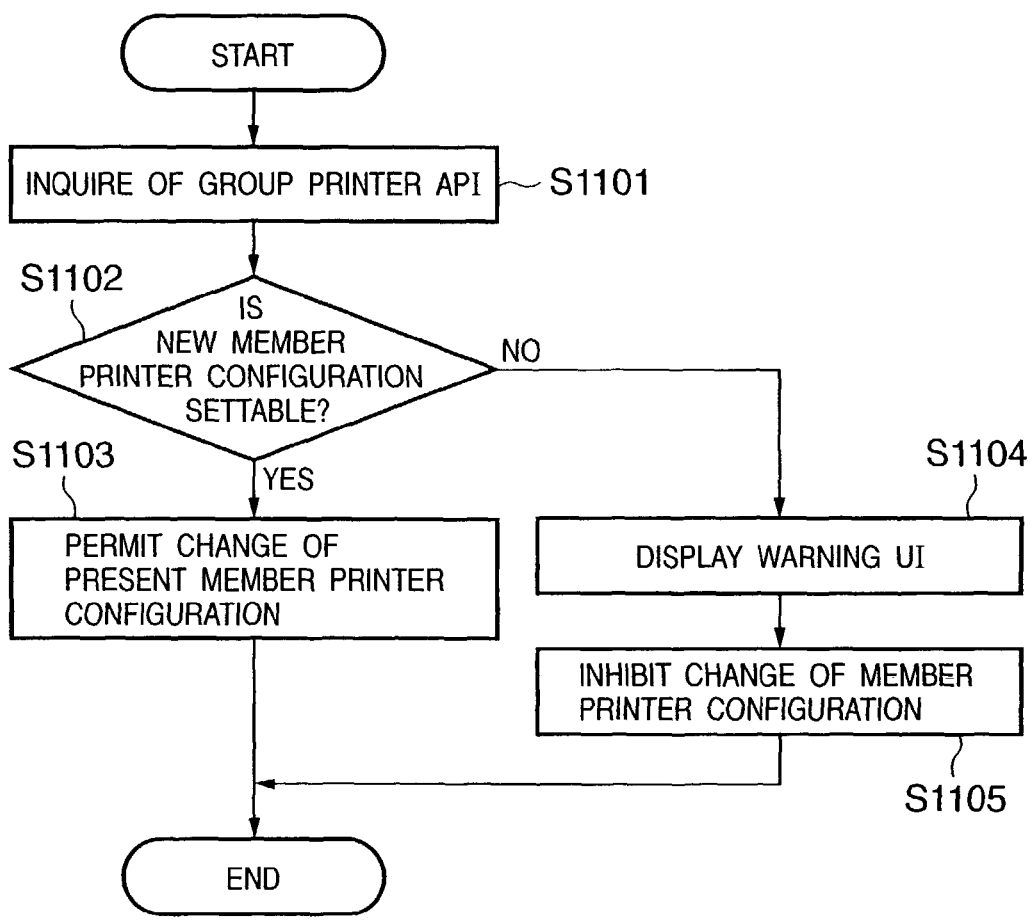
FIG. 11 is a flow chart showing the process control flow of checking whether the setting changed when the UI display process is performed by the group printer driver of the embodiment is valid.

Details of the process of checking whether the setting change is possible (step S1002) will be explained below with reference to a flow chart in FIG. 11. Note that processing in each step of this flow chart shown in FIG. 11 is implemented by the CPU (Central Processing Unit) of the information processing apparatus described above by loading a control program stored in a predetermined storage medium such as a ROM or FD or in a hard disk (HD), and executing processing based on the loaded program.

First, in step S1101, the CPU acquires member printer driver names usable by the group printer driver by using the print job control system API. In step S1102, the CPU compares one or a plurality of member printer driver names acquired in step S1101 with the configuration (identification information of a plurality of member printer drivers) of member printers held by the group printer driver in accordance with "favorite".

For example, if the configuration of member printer drivers corresponding to a newly selected "favorite" includes the printer drivers A and B as explained in FIG. 15, and if the entities of these member printer drivers as shown in FIG. 15 are registered in a usable form, the result of determination in step S1102 is YES. On the other hand, if the member printer driver configuration corresponding to the newly selected "favorite" includes the printer driver D, and if this printer driver D is not installed or registered in a form by which this print job control program can use the printer, the result of determination in step S1102 is NO.

If the result of comparison in step S1102 shows that any one of the member printers cannot be used by the printer job control system, in step S1104 the CPU displays the warning message as shown in FIG. 12. In this case, the CPU does not permit the change of the member printer driver configuration (step S1105). On the other hand, if all the member printers designated by the new member printer configuration are usable, in step S1103 the CPU permits the change of the member printer configuration and terminates the series of processes.

Note that in step S1105 described above, the change of the member printer configuration is not permitted. However, as a modification of step S1105, it is also possible to delete an unusable member printer from the present member printer configuration and then permit the change of this member printer configuration. This makes it possible to realize a printing setting environment meeting a user's desire more favorably.

With the above arrangement, detailed settings of member printer drivers can be registered as favorite. Also, when this favorite is selected, the settings of all member printers used by the group printer driver can be restored by a single operation.

Furthermore, favorite is registered by saving or copying data based on the data structure of DEVMODE. Therefore, even the setting of a member printer driver whose extended setting items are unknown can be restored only by transferring DEVMODE saved in this member printer driver.

Second Embodiment

In the second embodiment, the setting of the group printer driver via the user interface explained in the first embodiment will be described in more detail below.

Figure 17:
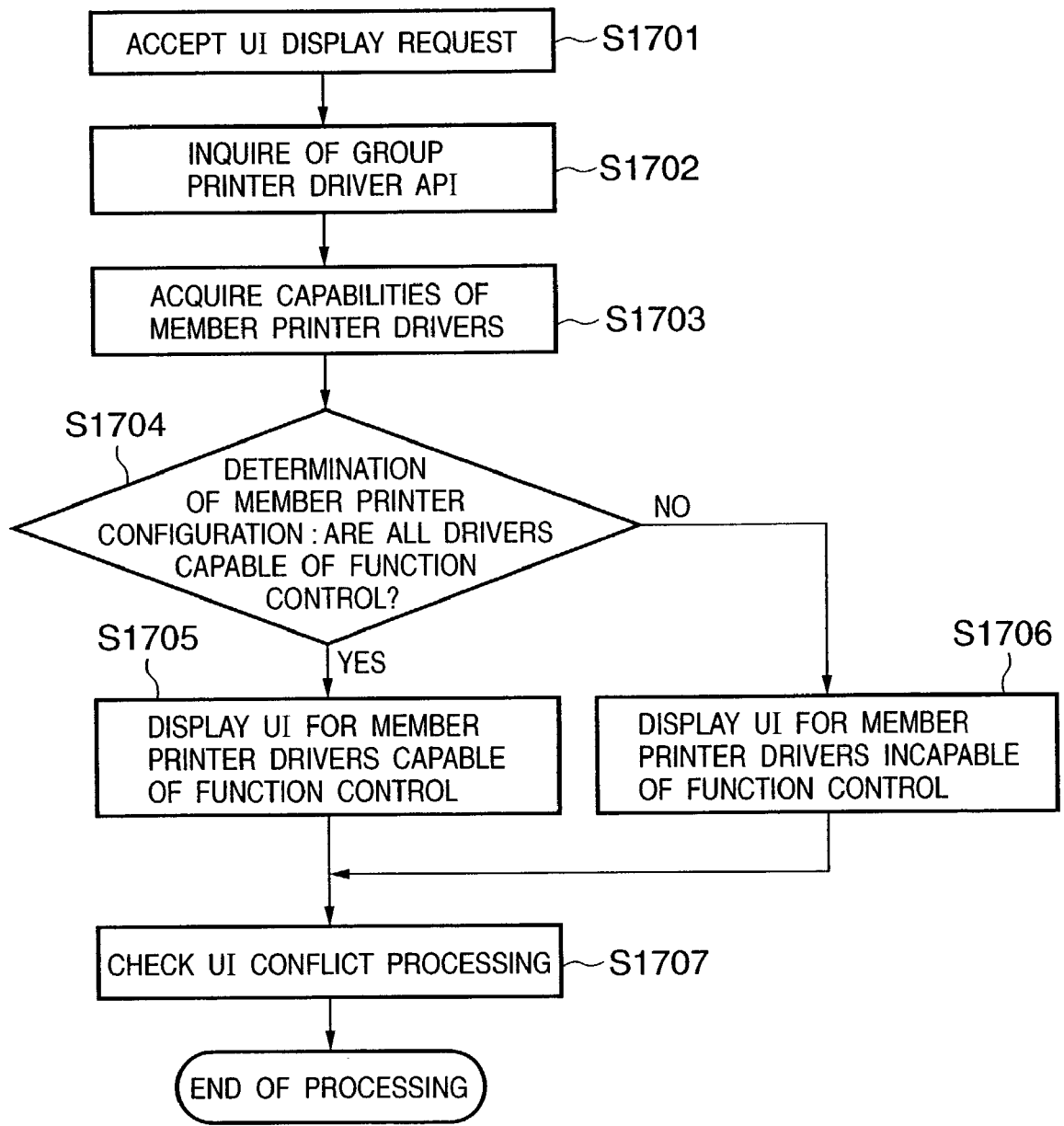
FIG. 17 is a flow chart showing the control flow of a print job control program according to the second embodiment.
Figure 18:
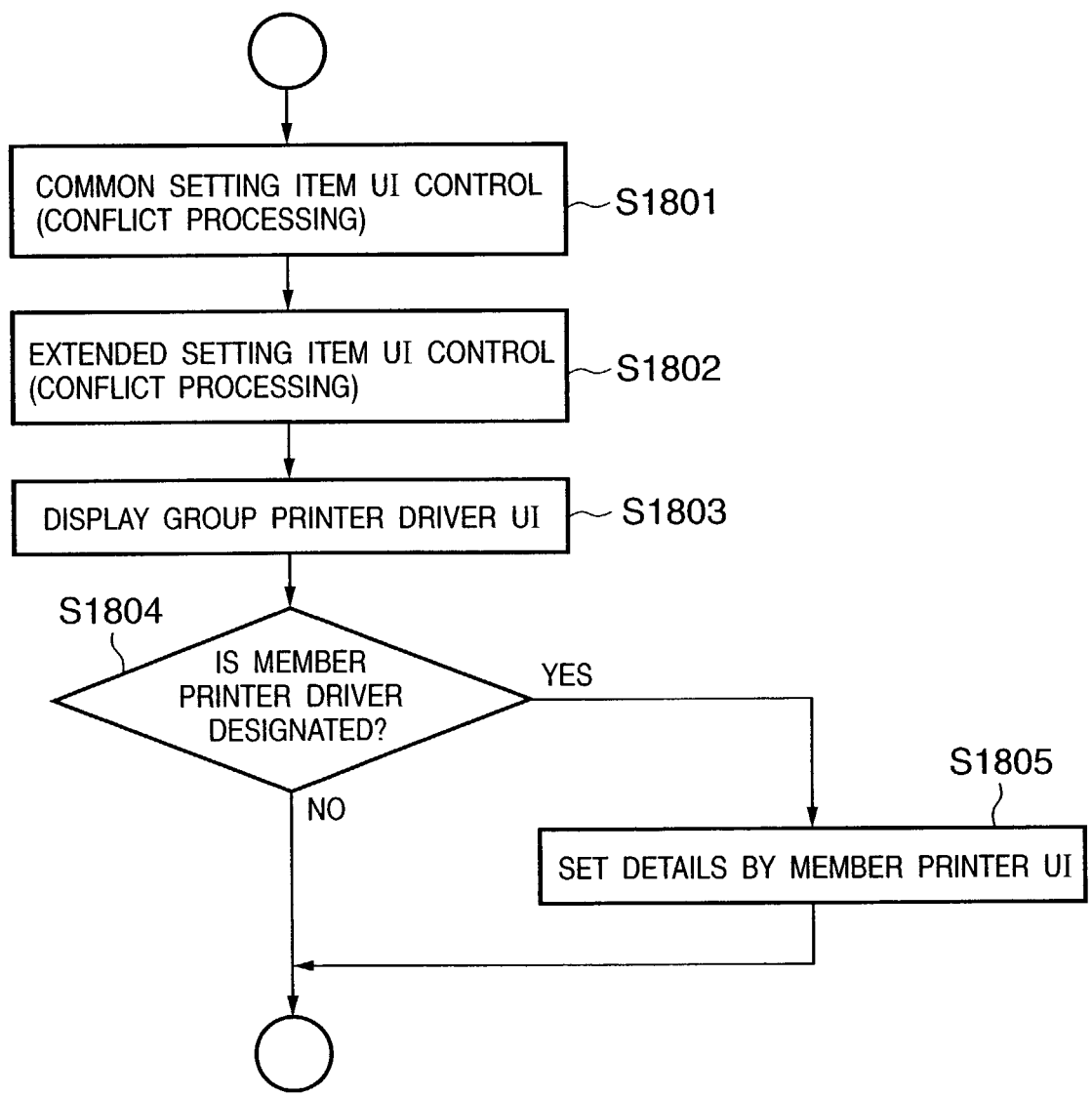
FIG. 18 is a flow chart showing the control flow of the print job control program according to the second embodiment.
Figure 19:
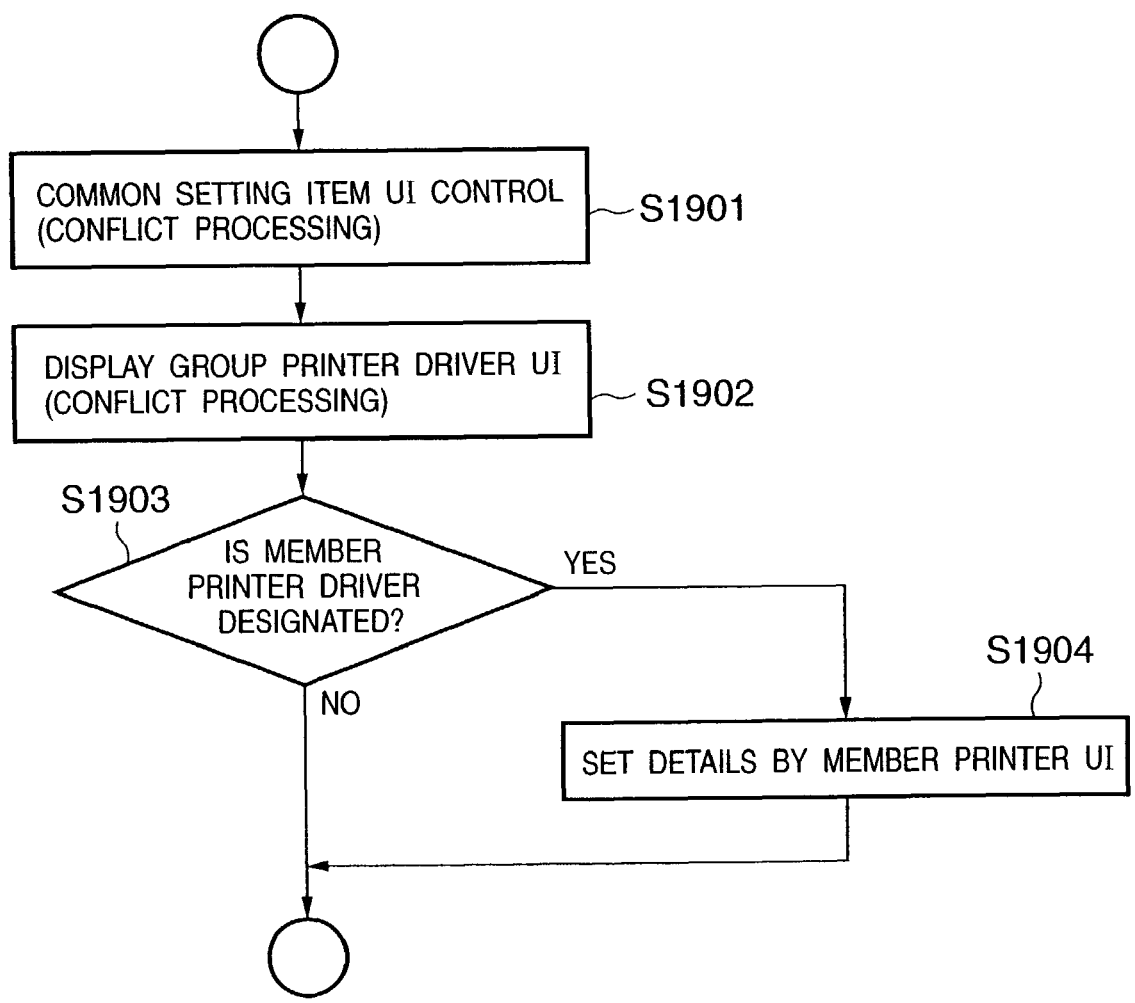
FIG. 19 is a flow chart showing the control flow of the print job control program according to the second embodiment.

FIGS. 17 to 19 are flow charts showing the control flows of this print job control program. Note that processing in each step of this flow charts shown in FIGS. 17 to 19 is implemented by a CPU (Central Processing Unit) of the information processing apparatus described above by loading a control program stored in a predetermined storage medium such as a ROM or FD or in a hard disk (HD), and executing processing based on the loaded program.

First, in step S1701, the CPU receives a group printer driver UI display request via the OS. In step S1702, the CPU uses the print job control system API to inquire the IDs (e.g., the names) of member printer drivers constructing the group printer driver, thereby acquiring the IDs of all member printer drivers constructing the group printer. In step S1703, the CPU acquires the capabilities of the individual member printer drivers in accordance with the IDs of these member printer drivers acquired in step S1702. More specifically, in step S1703, the CPU checks whether each of all the member printer drivers constructing the group printer is a "driver capable of function control" from which the group printer driver can acquire driver functions up to a portion of the extended region of driver setting information, and which can perform driver UI control, or a "driver incapable of function control" which is a driver other than the former driver, thereby obtaining information concerning the capability of function control. For example, the capability of function control can be determined by checking a response to a predetermined inquiry (e.g., APIcall).

In step S1704, the CPU checks the configuration of the member printers in accordance with the function control capability information obtained in step S1703. If the group is made up of only "drivers capable of function control", the flow advances to step S1705 (proceeds to processing in FIG. 18); if not, the flow advances to step S1706 (proceeds to processing in FIG. 19).

Common setting items and extended setting items are as shown in FIG. 15. The data format of the common setting items is a common data format regardless of providers. The data format (data meaning) of each extended setting item changes from one provider to another; some data formats can be loaded but cannot be recognized.

FIG. 18 is a flow representing the details of step S1705. In step S1801, the CPU performs function conflict processing by inquiring of each member printer driver about capabilities pertaining to individual common setting items, and, on the basis of the result of the processing, selects items to be displayed by the group printer driver UI. The function conflict processing is as follows. The presence/absence of each setting item is checked for each member printer driver as an object of the group printer. If all the member printer drivers as objects have a certain function, the group printer driver UI handles this function as a settable item. If even one member printer driver does not have a given function, the corresponding item is handled as a non-settable item.

In step S1802, the CPU performs the function conflict processing shown in step S1801 for extended setting items of each member printer driver. In step S1803, on the basis of the results of conflict processing executed in steps S1801 and S1802, the CPU displays the group printer driver UI (e.g., the UI as shown in FIG. 13 or 14), and sets individual items in accordance with user's instructions.

For a function which is found by the above conflict processing not to exist in some member printers, UI control by which the item is grayed out or is not displayed at all is performed so that the item cannot be set on the UI. No such UI control is performed for functions present in all the member printers. In this step, it is also possible to perform UI control to prevent conflict between setting items, if the user designates a functionally impossible combination, e.g., "bookbinding printing" and punch or staple.

In step S1804, the CPU checks whether a member printer driver is designated in order to set details of a setting item not present on the group printer driver UI by opening the UI of the member printer. A member printer driver to be designated is one of the member printers forming the group printer driver and is selected from the list of member printer drivers shown in FIG. 16 in accordance with input via a pointing device such as a mouse.

If it is determined in step S1804 that a member printer driver is selected, the flow advances to step S1805. In step S1805, the member printer driver UI designated in step S1804 is displayed, and detailed setting is performed via this UI.

For example, if a printer driver C shown in FIG. 16 is selected, a member printer driver UI unique to this printer driver C is displayed. If "watermark" is set to "present", "watermark" of the printer driver C is set to "present" as indicated by 1505 in FIG. 15.

This is equivalent to processing performed when only this printer driver C has a watermark function.

If registration of favorite is designated (YES in step S1005) while the state in which "watermark" is set to "present" in the printer driver C is held without being changed, the printing setting information individually set on the member printer driver UI is also saved (registered) as part of the composite printing setting information of the favorite. The printing setting information of each item set on the group printer driver UI is, of course, also saved (registered) as the composite printing setting information.

When the member printer driver UI is opened, items settable by the group printer driver can also be set. Therefore, if the same function is set on the two UIs, the processing is doubled. To prevent this inconvenience, the following UI control is performed to control the display.

(A) If the member printer is a "driver capable of function control", items competing with setting items on the group printer driver UI are grayed out or are not displayed at all by UI control, so that these items cannot be set on the member printer driver UI.

(B) If the member printer is a "driver incapable of function control", each common setting item is displayed on the UI in accordance with the contents set by the member printer driver. If this item is changed on the member printer driver UI after the UI display, in the step of closing the driver UI the information of the setting item set by the group printer driver is overwritten with the common setting item of the corresponding member printer driver, thereby inhibiting the setting change on the member printer UI.

In performing the overwriting process, a warning indicating that the setting change on the member printer UI is invalid can be displayed.

Note that in step S1805, UI control (A) described above is performed because all member printers as objects are "drivers capable of function control".

When the processing in step S1805 is completed, the flow proceeds to step S1707 in FIG. 17.

FIG. 19 is a flow chart showing the details of step S1706. The flow proceeds to step S1706 only when the member printer driver configuration is different from step S1705, i.e., when the member printer driver configuration includes both "drivers capable of function control" and "drivers incapable of function control", or includes only "drivers incapable of function control". In these cases, items settable by the group printer driver UI are limited to common setting items whose printing setting information can be read and written in common.

In step S1901, similar to step S1801 in FIG. 18, the CPU inquires of each member printer driver about capabilities concerning the individual common setting items, performs function conflict processing, and, on the basis of the result of the processing, selects items to be displayed on the group printer driver UI. In step S1902, on the basis of the result of the UI conflict processing performed in step S1901, the CPU displays the group printer driver UI as shown in FIG. 13 or 14. In this step, the CPU performs control such that items found to have no functions by the conflict processing and the extended setting items are grayed out or are not displayed at all, as non-settable items, so as not to be set on the group printer driver UI.

To set those extended setting items and setting items unique to each member printer, which cannot be set in step S1902, the UI of each member printer must be used. In step S1903, therefore, to open the UI of each member printer, the CPU checks whether a member printer to be set is designated on the group printer driver UI. If the member printer is designated, the flow advances to step S1904, and the CPU opens the member printer driver UI designated in step S1903, thereby enabling detailed setting by the user.

For example, assume that the printer driver C shown in FIG. 16 is selected (equivalent to step S1903), the member printer driver UI unique to this printer driver C is displayed, and "watermark" is set to "present". In this case, "watermark" of the printer driver C is set to "present" as indicated by 1505 in FIG. 15.

This processing is performed when, for example, the providers of the printer drivers A, B, and C are different, the data formats (data meanings) of the extended setting items are different, and the printer driver C has the watermark function.

If registration of favorite is designated (YES in step S1005) while the state in which "watermark" is set to "present" in the printer driver C is held without being changed, the printing setting information individually set on the member printer driver UI is also saved (registered) as part of the set state of the favorite. The printing setting information of each item set on the group printer driver UI is, of course, also saved (registered) as the printing setting information of the favorite.

After step S1904, the flow proceeds to step S1707 in FIG. 17.

In the flow charts shown in FIGS. 17 to 19 and the flow chart shown in FIG. 10 explained above, item information set via the user interface unique to a member printer driver is also saved (registered) as part of the printing setting information of favorite. Therefore, when this favorite is selected later and set for a plurality of member printer drivers at once (e.g., S1004), printing setting information (e.g., "watermark" described above) individually set via the user interface of a member printer driver is also restored to the member printer driver as an object of the individual setting. Accordingly, a user interface readily usable by a user can be provided.

In each embodiment as described above, when the set contents of a plurality of member printer drivers are collectively set via the group printer driver UI, this printing setting information can be saved as composite printing setting (favorite). Also, a user can reuse the saved composite printing setting. Therefore, even when performing printing by using a plurality of member printer drivers, the user need not open the UIs of the individual member printer drivers to separately reset the set contents a number of times.

Additionally, the held setting unique to a member printer driver can be registered in a composite setting list as part of the composite printing setting information. Furthermore, a plurality of different pieces of composite printing setting information can be registered and selected from a list. This mechanism further improves the ease of use for users.

The present invention can be applied to a system constituted by a plurality of devices (e.g., a host computer, interface, reader, and printer) or to an apparatus (e.g., a copying machine or facsimile apparatus) comprising a single device.

Further, the object of the present invention can also be achieved by supplying a storage medium storing program codes of software for implementing the functions of the above embodiments to a system or apparatus, and reading out and executing the program codes stored in the storage medium by a computer (or a CPU or MPU) of the system or apparatus.

In this case, the program codes read out from the storage medium implement the functions of the present invention, and the storage medium storing these program codes constitutes the invention.

As this storage medium for supplying the program codes, it is possible to use, e.g., a floppy disk, hard disk, optical disk, magnetooptical disk, CD-ROM, CD-R, magnetic tape, non-volatile memory card, and ROM.

Furthermore, besides the functions of the above embodiments are implemented by executing the readout program codes by the computer, the present invention includes a case where an OS (Operating System) or the like running on the computer performs part or the whole of actual processing in accordance with designations by the program codes and thereby implements the functions of the above embodiments.

Furthermore, the present invention also includes a case where the program codes read out from the storage medium are written in a memory of a function extension board inserted into the computer or of a function extension unit connected to the computer, and, in accordance with designations by the program codes, a CPU or the like of the function extension board or function extension unit performs part or the whole of actual processing and thereby implements the functions of the above embodiments.

As has been explained above, the present invention can provide a mechanism capable of realizing efficient printing setting for a plurality of printer drivers.

As many apparently widely different embodiments of the present invention can be made without departing from the spirit and scope thereof, it is to be understood that the invention is not limited to the specific embodiments thereof except as defined in the claims.

What is claimed is:

1. An information processing method of an information processing apparatus having a virtual printer capable of comprehensively controlling a plurality of member printers based on a print command to perform a predetermined output method, said information processing method comprising:
    an instructing step of instructing to add or delete a member printer to be comprehensively controlled by the virtual printer;
    a first setting control step of setting common print setting information to the virtual printer and individually setting individual printing setting information to each of the plurality of the member printers;
    a registration step of registering via a user interface of the virtual printer, the common printing setting information which is set in the virtual printer, a combination of information of the plurality of member printers, and individual printing setting information which is set in each of the plurality of member printers, in the virtual printer as one reusable composite printing setting information;
    a display controlling step of displaying in the user interface of the virtual printer a plurality of composite printing setting information that have been registered by repeating several times said registration step, such that any one of composite printing setting information can be selected;
    a selection step of selecting, via the user interface of the virtual printer, any one of composite printing setting information from the plurality of composite printing setting information;
    a second setting control step of automatically setting to the virtual printer driver the common printing setting information and automatically setting to each of the plurality of member printers included in the combination of information the individual printing setting information corresponding to the member printer, in response to a selection of the composite printing setting information in said selection step; and
    a generating step of generating the plurality of jobs by comprehensively controlling the plurality of member printers to which the common printing setting information and the individual printing setting information is individually set by the second setting control step.

2. The method according to claim 1, wherein the composite printing setting information includes settings set via a user interface of the virtual printer, which collectively sets the plurality of member printers, and a name is associated with the composite printing setting information.

3. The method according to claim 1, wherein the composite printing setting information includes information for enabling to generate DEVMODE information of each of the plurality of member printers.

4. The method according to claim 3, wherein the DEVMODE information includes both common setting items and extended setting items.

5. The method according to claim 1, further comprising a list generation step of generating information for displaying a plurality of pieces of composite printing setting information as a list from which a user can select any of the plurality of pieces of composite printing setting information.

6. The method according to claim 1, wherein the composite printing setting information includes a setting from output methods using the plurality of member printers, and the output methods include distributed printing and broadcast printing, or distributed printing and print job redirecting printing.

7. The method according to claim 1, wherein said registration step includes reflecting a change of combination of member printers which results from an instruction indicating addition or deletion of a member printer, to composite printing setting information, and registering the composite printing setting information.

8. The method according to claim 1, further comprising:
    a determination step of determining whether each of a plurality of member printers corresponding to the composite printing setting information selected in said selection step is usable; and
    a warning display control step of performing control such that a warning is displayed, if it is determined in said determination step that any of the plurality of member printers is unusable.

9. The method according to claim 1, wherein the settings set to each of the plurality of member printers include a setting which is different from settings set to others of the member printers.

10. An information processing apparatus having a virtual printer capable of comprehensively controlling a plurality of member printers based on a print command to perform a predetermined output method, said information processing apparatus comprising:
    an instructing unit configured to instruct adding or deleting a member printer to be comprehensively controlled by the virtual printer;
    a first setting control unit configured to set common printing setting information to the virtual printer and to set individual printing setting information to each of the plurality of the member printers;
    a registration unit configured to register via a user interface of the virtual printer, the common printing setting information which is set in the virtual printer, a combination of information of the plurality of member printers, and individual printing setting information which is set in each of the plurality of member printers, in the virtual printer as one reusable composite printing setting information;
    a display controlling unit configured to display in the user interface of the virtual printer a plurality of composite printing setting information that have been registered by repeating several times said registration step, such that any one of composite printing setting information can be selected;
    a selection unit configured to select, via the user interface of the virtual printer, any one of composite printing setting information from the plurality of composite printing setting information;

a second setting control unit configured to automatically set to the virtual printer driver the common printing setting information and automatically set to each of the plurality of member printers included in the combination of information, the individual printing setting information corresponding to the member printer, in response to a selection of the composite printing setting information in said selection unit; and a generating unit configured to generate the plurality of jobs by comprehensively controlling the plurality of member printers to which the common printing setting information and the individual printing setting information is individually set by the second setting control unit.

11. The apparatus according to claim 10, wherein the composite printing setting information includes settings set via a user interface of the virtual printer, which collectively sets the plurality of member printers, and a name is associated with the composite printing setting information.

12. The apparatus according to claim 10, wherein the composite printing setting information includes information for enabling to generate DEVMODE information of each of the plurality of member printers.

13. The apparatus according to claim 10, wherein the DEVMODE information includes both common setting items and extended setting items.

14. The apparatus according to claim 10, further comprising a list generation unit configured to generate information for displaying a plurality of pieces of composite printing setting information as a list from which a user can select any of the plurality of pieces of composite printing setting information.

15. The apparatus according to claim 10, wherein the composite printing setting information includes a setting from output method using the plurality of member printers, and the output methods include distributed printing and broadcast printing, or distributed printing and print job redirecting printing.

16. The apparatus according to claim 10, wherein said registration unit reflects a change of combination of member printers which results from an instruction indicating addition or deletion of a member printer, to composite printing setting information, and registers the composite printing setting information.

17. The apparatus according to claim 10, further comprising:

a determination unit configured to determine whether each of a plurality of member printers corresponding to the composite printing setting information selected by said selection unit is usable; and a warning display control unit configured to perform control such that a warning is displayed, if said determination unit determines that any of the plurality of member printers is unusable.

18. The apparatus according to claim 10, wherein the settings set to each of the plurality of member printers includes a setting which is different from settings set to others of the member printers.

19. A computer-executable program stored on a computer-readable storage medium allowing a computer to execute an information processing method of an information processing apparatus having a virtual printer capable of comprehensively controlling a plurality of member printers based on a print command to perform a predetermined output method, said information processing method comprising:

an instructing step of instructing to add or delete a member printer to be comprehensively controlled by the virtual printer;

a first setting control step of setting common print setting information to the virtual printer and individually setting individual printing setting information to each of the plurality of the member printers;

a registration step of registering via a user interface of the virtual printer, the common printing setting information which is set in the virtual printer, a combination of information of the plurality of member printers, and individual printing setting information which is set in each of the plurality of member printers, in the virtual printer as one reusable composite printing setting information;

a display controlling step of displaying in the user interface of the virtual printer a plurality of composite printing setting information that have been registered by repeating several times said registration step, such that any one of composite printing setting information can be selected;

a selection step of selecting, via the user interface of the virtual printer, any one of composite printing setting information from the plurality of composite printing setting information;

a second setting control step of automatically setting to the virtual printer driver the common printing setting information and automatically setting to each of the plurality of member printers included in the combination of information the individual printing setting information corresponding to the member printer, in response to a selection of the composite printing setting information in said selection step; and a generating step of generating the plurality of jobs by comprehensively controlling the plurality of member printers to which the common printing setting information and the individual printing setting information is individually set by the second setting control step.

20. The computer-executable program stored on a computer-readable storage medium according to claim 19, wherein the composite printing setting information includes settings set via a user interface of the virtual printer, which collectively sets the plurality of member printers, and a name is associated with the composite printing setting information.

21. The computer-executable program stored on a computer-readable storage medium according to claim 19, wherein the composite printing setting information includes information for enabling to generate DEVMODE information of each of the plurality of member printers.

22. The computer-executable program stored on a computer-readable storage medium according to claim 21, wherein the DEVMODE information includes both common setting items and extended setting items.

23. The computer-executable program stored on a computer-readable storage medium according to claim 19, wherein the information processing method further comprises a list generation step of generating information for displaying a plurality of pieces of composite printing setting information as a list from which a user can select any of the plurality of pieces of composite printing setting information.

24. The computer-executable program stored on a computer-readable storage medium according to claim 19, wherein the composite printing setting information includes a setting of output method using the plurality of member printers, and the output method includes distributed printing and broadcast printing, or distributed printing and print job redirecting printing.

25. The computer-executable program stored on a computer-readable storage medium according to claim 19, wherein said registration step includes reflecting a change of combination of member printers which results from an instruction indicating addition or deletion of a member printer, to composite printing setting information, and registering the composite printing setting information.

26. The computer-executable program stored on a computer-readable storage medium according to claim 19, wherein the information processing method further comprises:

a determination step of determining whether each of a plurality of member printers corresponding to the composite printing setting information selected in said selection step is usable; and a warning display control step of performing control such that a warning is displayed, if it is determined in said determination step that any of the plurality of member printers is unusable.

27. The computer-executable program stored on a computer-readable storage medium according to claim 19, wherein the settings set to each of the plurality of member printers include a setting which is different from settings set to others of the member printers.

* * * * *